(12) United States Patent
Ma et al.

(10) Patent No.: US 11,796,852 B2
(45) Date of Patent: Oct. 24, 2023

(54) LIQUID CRYSTAL DISPLAY, ELECTRONIC DEVICE, AND LIQUID CRYSTAL DISPLAY MANUFACTURING METHOD

(71) Applicant: Huawei Technologies Co., Ltd., Shenzhen (CN)

(72) Inventors: Lei Ma, Shenzhen (CN); Peng Wang, Shenzhen (CN); Guangnan Xiao, Shenzhen (CN); Feng Zhang, Shenzhen (CN); Binbin Su, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 48 days.

(21) Appl. No.: 17/416,304

(22) PCT Filed: Dec. 2, 2019

(86) PCT No.: PCT/CN2019/122319
§ 371 (c)(1),
(2) Date: Jun. 18, 2021

(87) PCT Pub. No.: WO2020/125387
PCT Pub. Date: Jun. 25, 2020

(65) Prior Publication Data
US 2022/0026762 A1    Jan. 27, 2022

(30) Foreign Application Priority Data
Dec. 20, 2018  (CN) .......................... 201811565388.4

(51) Int. Cl.
*G02F 1/1335*    (2006.01)
*G02F 1/1333*    (2006.01)
*F21V 8/00*      (2006.01)

(52) U.S. Cl.
CPC ..... *G02F 1/133512* (2013.01); *G02B 6/0088* (2013.01); *G02F 1/133308* (2013.01); *G02F 1/133388* (2021.01); *G02F 1/133528* (2013.01)

(58) Field of Classification Search
CPC ......... G02F 1/133512; G02F 1/133308; G02F 1/133388; G02F 1/133528;
(Continued)

(56) References Cited

U.S. PATENT DOCUMENTS 8,120,722 B2    2/2012  Jung et al.
9,720,287 B2    8/2017  Yoshida
(Continued)

FOREIGN PATENT DOCUMENTS

CN    102236182 A    11/2011
CN    105301848 A    2/2016
(Continued)

*Primary Examiner* — Michael H Caley
*Assistant Examiner* — Agnes Dobrowolski
(74) *Attorney, Agent, or Firm* — SLATER MATSIL, LLP

(57) ABSTRACT

A liquid crystal display, including a transparent region, a light shielding region, and a display region. The liquid crystal display includes a liquid crystal box, a lower polarizer, and a backlight module that are sequentially disposed in a stacked manner. A part of the liquid crystal box is located in the transparent region and is configured to allow visible light to pass through, a part of the liquid crystal box is located in the light shielding region and is configured to shield visible light, and a part of the liquid crystal box is located in the display region and is configured to display an image.

20 Claims, 7 Drawing Sheets

(58) Field of Classification Search
CPC ............ G02F 1/133615; G02F 1/1333; G02F 1/1335; G02F 1/1336; G02F 1/133608; G02B 6/0088; H04M 1/026; H04M 1/0266; H04M 2250/12; H04M 1/0264; G06F 1/1637; G06F 1/1686
See application file for complete search history.

(56) References Cited

U.S. PATENT DOCUMENTS

| | | | |
|---|---|---|---|
| 2011/0261283 A1* | 10/2011 | Kim | G03B 17/02 349/58 |
| 2014/0016043 A1 | 1/2014 | Chen et al. | |
| 2014/0063407 A1* | 3/2014 | Kwon | G02F 1/1339 349/106 |
| 2021/0072588 A1 | 3/2021 | Tang et al. | |
| 2021/0271296 A1* | 9/2021 | Liu | G02B 5/3025 |

FOREIGN PATENT DOCUMENTS

| | | |
|---|---|---|
| CN | 108803146 A | 11/2018 |
| CN | 108845450 A | 11/2018 |
| CN | 108873473 A | 11/2018 |
| CN | 108900672 A | 11/2018 |
| CN | 108957829 A | 12/2018 |
| CN | 108989508 A | 12/2018 |
| CN | 109031756 A | 12/2018 |
| CN | 109272868 A | 1/2019 |
| CN | 109597236 A | 4/2019 |
| JP | 2006126462 A | 5/2006 |
| JP | 2008176263 A | 7/2008 |
| JP | 2014026200 A | 2/2014 |
| KR | 20120118205 A | 10/2012 |
| WO | 2014112323 A1 | 7/2014 |
| WO | 2015045694 A1 | 4/2015 |

* cited by examiner

LIQUID CRYSTAL DISPLAY, ELECTRONIC DEVICE, AND LIQUID CRYSTAL DISPLAY MANUFACTURING METHOD

CROSS REFERENCE TO RELATED APPLICATIONS

This application is a national stage of International Application No. PCT/CN2019/122319, filed on Dec. 2, 2019, which claims priority to Chinese Patent Application No. 201811565388.4, filed on Dec. 20, 2018. Both of the aforementioned applications are hereby incorporated by reference in their entireties.

TECHNICAL FIELD

This application relates to the field of display technologies, and in particular, to a liquid crystal display, an electronic device, and a liquid crystal display manufacturing method.

BACKGROUND

Components such as a camera module and an ambient light sensor need to be placed on a periphery of a screen of a conventional mobile phone. Consequently, arrangement space of the screen of the mobile phone is limited, and a screen-to-body ratio of the mobile phone is relatively low.

SUMMARY

Embodiments of this application provide a liquid crystal display and an electronic device each with a relatively high screen-to-body ratio, and a liquid crystal display manufacturing method.

According to a first aspect, an embodiment of this application provides a liquid crystal display. The liquid crystal display may be applied to an electronic device.

The liquid crystal display includes a transparent region, a light shielding region surrounding a periphery of the transparent region, and a display region surrounding a periphery of the light shielding region. The liquid crystal display includes a liquid crystal box, a lower polarizer, and a backlight module that are sequentially disposed in a stacked manner. A part that is of the liquid crystal box and that is located in the transparent region is configured to allow visible light to pass through. A part that is of the liquid crystal box and that is located in the light shielding region is configured to shield visible light. A part that is of the liquid crystal box and that is located in the display region is configured to display an image. The lower polarizer covers the display region and is provided with a transparent hole. A hole wall of the transparent hole is located in the light shielding region. In this case, the transparent hole covers the transparent region, so that visible light can pass through the transparent region. The backlight module includes a bracket and a backlight film. The bracket includes an outer peripheral side part, an inner hole side part located on an inner side of the outer peripheral side part, and a bottom part connected between the outer peripheral side part and the inner hole side part. The outer peripheral side part, the inner hole side part, and the bottom part jointly form accommodation space, and the backlight film is accommodated in the accommodation space and covers the display region. The inner hole side part is located in the light shielding region. A structure of a through hole that covers the transparent region is formed on a side that is of the inner hole side part and that is away from the outer peripheral side part, to allow visible light to pass through.

In this embodiment, the transparent region of the liquid crystal display allows visible light to pass through. Therefore, an optical device of the electronic device can directly face the transparent region, and is placed below the transparent region, to transmit visible light by using the transparent region. In this way, there is no need to occupy lateral peripheral space of the liquid crystal display, so that a limitation of the optical device on arrangement space of the liquid crystal display is reduced; in addition, the transparent region is surrounded by the display region, so that a larger display region can be disposed on the liquid crystal display, to reduce a frame area of the electronic device, increase a display area of the electronic device, and increase a screen-to-body ratio of the electronic device.

Optionally, the liquid crystal display further includes a light shielding part. The light shielding part can shield visible light. The light shielding part is located in the light shielding region and continuously surrounds the transparent region. The light shielding part is connected to the liquid crystal box, the hole wall of the transparent hole, and the inner hole side part.

In this embodiment, because the light shielding part is connected to the hole wall of the transparent hole, the liquid crystal box, and the inner hole side part, the light shielding part can shield visible light. Therefore, light of the backlight module does not escape from the hole wall of the transparent hole or a part between the inner hole side part and the liquid crystal box to the transparent region, to avoid a light leakage and uneven displaying on a periphery of the transparent region of the liquid crystal display, and also help ensure working quality of the optical device. In addition, a light leakage at a large angle of view does not occur when the light that is of the backlight module and that enters the lower polarizer is emitted from the hole wall of the transparent hole, so that the liquid crystal display has better display quality.

Optionally, the outer peripheral side part, the inner hole side part, and the bottom part are integrally formed. In other words, the bracket is integrally formed. The bracket may be formed through mechanical processing such as board stamping. The bracket may be made of a metal material such as iron, stainless steel, or aluminum. In this case, a processing manner of the bracket is simple, difficulty is low, and processing costs are relatively low.

In an optional embodiment, the light shielding part includes a first adhesive part formed by using a first adhesive dispensing process and a second adhesive part formed by using a second adhesive dispensing process. The first adhesive part is connected to the hole wall of the transparent hole and the liquid crystal box. The second adhesive part is connected to the inner hole side part and the first adhesive part.

The second adhesive part and the first adhesive part form an integrated structure after the second adhesive dispensing process. The second adhesive dispensing process may be performed after the first adhesive part is semi-cured or completely cured.

The first adhesive part continuously surrounds the transparent region. The first adhesive part extends in a circumferential direction of the light shielding region. The first adhesive part is approximately annular. The first adhesive part may be made of a light shielding material. The first adhesive part may be a hot curing adhesive or a wet curing adhesive. The second adhesive part continuously surrounds the transparent region. The second adhesive part extends in the circumferential direction of the light shielding region. The second adhesive part is approximately annular. The second adhesive part may be made of a light shielding material. The first adhesive part may be a hot curing adhesive or a wet curing adhesive.

In this embodiment, the first adhesive part can shield leaked light from the lower polarizer on the hole wall of the transparent hole, and the second adhesive part can enable the backlight module to be fixedly connected to the liquid crystal box and can shield leaked light from the backlight module, so that the light shielding part can shield leaked light on a periphery of the transparent region, and the liquid crystal display has better display quality.

The light shielding part includes the first adhesive part and the second adhesive part that are stacked and that are formed by using the two mutually independent adhesive dispensing processes, so that the light shielding part has both a smaller cross-sectional area (parallel to a direction of the lower polarizer) and a larger height size (perpendicular to the direction of the lower polarizer). Therefore, the lower polarizer and the backlight module are better bonded, and the light shielding region is relatively narrow.

In an optional embodiment, the first adhesive part has a first surface facing the transparent region. The second adhesive part has a second surface facing the transparent region. The second surface is flush with the first surface, or the second surface is away from the transparent region relative to the first surface.

In this embodiment, the second surface is flush with the first surface or is away from the transparent region relative to the first surface. Therefore, a distance between the second adhesive part and the transparent region is greater than or equal to a distance between the first adhesive part and the transparent region, so that the second adhesive part can fully use a size of the first adhesive part in a width direction of the light shielding region, to help reduce a width of the light shielding region. Therefore, the liquid crystal display and the electronic device each have a more beautiful appearance, and a screen-to-body ratio is higher.

In an optional embodiment, the second surface is gradually away from the transparent region in a direction of being away from the first adhesive part. In this case, an adhesive dispensing amount of the second adhesive part is relatively small, and costs of the liquid crystal display are relatively low.

In an optional embodiment, a surface that is of the first adhesive part and that is connected to the second adhesive part is a rough surface formed through surface roughening. One or more microstructures that can increase a surface area, such as a concave spot, a convex spot, a groove, a bump, a concave texture, or a convex texture, can be formed through surface roughening on the surface that is of the first adhesive part and that is connected to the second adhesive part, so that the surface that is of the first adhesive part and that is connected to the second adhesive part is the rough surface, a bonding area between the second adhesive part and the first adhesive part is larger, and bonding force is stronger. Therefore, the second adhesive part is not easily detached from the first adhesive part, and the light shielding part has higher reliability.

In an optional embodiment, the inner hole side part abuts against the lower polarizer. An inner side surface that is of the inner hole side part and that faces away from the outer peripheral side part is flush with the hole wall of the transparent hole, and a thickness of the first adhesive part is less than or equal to a thickness of the lower polarizer.

In this embodiment, because the thickness of the first adhesive part is less than or equal to the thickness of the lower polarizer, a top surface that is of the inner hole side part and that faces away from the bottom part can better abut against the lower polarizer, so that the backlight module and the liquid crystal display panel have higher assembly precision, and the liquid crystal display has a higher yield rate.

In an optional embodiment, the inner hole side part abuts against the lower polarizer and the first adhesive part. A thickness of the first adhesive part is equal to a thickness of the lower polarizer.

In this embodiment, because the thickness of the first adhesive part is equal to the thickness of the lower polarizer, a top surface that is of the inner hole side part and that is away from the bottom part can smoothly abut against the lower polarizer and the first adhesive part, so that the backlight module and the liquid crystal display panel have higher assembly precision, and the liquid crystal display has a higher yield rate.

In an optional embodiment, the inner hole side part abuts against the lower polarizer. The hole wall of the transparent hole is closer to the transparent region compared with an inner side surface that is of the inner hole side part and that faces away from the outer peripheral side part. In this embodiment, because the hole wall of the transparent hole is close to the transparent region relative to the inner side surface of the inner hole side part, the inner hole side part completely abuts against the lower polarizer, so that disposing the first adhesive part does not affect assembly precision of the backlight module and the liquid crystal display panel, and the liquid crystal display can have a higher yield rate.

In this embodiment, a size relationship between a thickness of the first adhesive part and a thickness of the lower polarizer is not strictly limited. For example, in an implementation, the thickness of the first adhesive part may be the same as the thickness of the lower polarizer. In another implementation, the thickness of the first adhesive part may alternatively be less than the thickness of the lower polarizer. In still another implementation, the thickness of the first adhesive part may alternatively be greater than the thickness of the lower polarizer. In this case, the inner side surface of the inner hole side part and the first adhesive part form a groove structure. In a process of forming the second adhesive part, a part of the second adhesive part flows into the groove structure, so that a connection area between the second adhesive part and the first adhesive part is larger, and a connection area between the second adhesive part and the inner side surface of the inner hole side part is larger. Therefore, the light shielding part can be better and securely connected to the backlight module and the liquid crystal display panel, and the light shielding part has higher reliability.

In an optional embodiment, the inner hole side part abuts against the first adhesive part. The hole wall of the transparent hole is away from the transparent region relative to the inner hole side part.

In this embodiment, because the hole wall of the transparent hole is away from the transparent region relative to the inner hole side part, the inner hole side part completely abuts against the first adhesive part, so that a size relationship between a thickness of the first adhesive part and a thickness of the lower polarizer does not affect assembly precision of the backlight module and the liquid crystal display panel, and the liquid crystal display can have a higher yield rate.

In this embodiment, the size relationship between the thickness of the first adhesive part and the thickness of the lower polarizer is not strictly limited. For example, in an implementation, the thickness of the first adhesive part may be the same as the thickness of the lower polarizer. In another implementation, the thickness of the first adhesive part may alternatively be less than the thickness of the lower polarizer. In this case, the inner hole side part can reuse a part of thickness space of the lower polarizer, to facilitate lightness and thinness of the liquid crystal display and the electronic device. In still another implementation, the thickness of the first adhesive part may alternatively be greater than the thickness of the lower polarizer. In this case, the inner side surface of the inner hole side part and the first adhesive part form a groove structure. In a process of forming the second adhesive part, a part of the second adhesive part flows into the groove structure, so that a connection area between the second adhesive part and the first adhesive part is larger, and a connection area between the second adhesive part and the inner side surface of the inner hole side part is larger. Therefore, the light shielding part can be better and securely connected to the backlight module and the liquid crystal display panel, and the light shielding part has higher reliability.

In an optional embodiment, the light shielding part includes a double-sided tape. The double-sided tape is located between the backlight module and the liquid crystal box, and is connected to the backlight film, the hole wall of the transparent hole, the inner hole side part, and the liquid crystal box. The double-sided tape continuously surrounds the transparent region. In other words, the double-sided tape extends in a circumferential direction of the light shielding region. The double-sided tape is approximately annular. The double-sided tape may include a light shielding substrate and bonding layers located on two opposite sides of the substrate.

In this embodiment, the double-sided tape is connected to the backlight film, the hole wall of the transparent hole, the inner hole side part, and the liquid crystal box, so that the backlight film is fastened to the bracket, and the backlight module is fastened to the liquid crystal display panel, and can shield light emitted from the hole wall of the transparent hole and light emitted from the backlight film, to reduce a risk of a light leakage on the liquid crystal display. Therefore, the liquid crystal display has a better display effect.

In this embodiment, a width of the double-sided tape is relatively small, and a width of the light shielding region of the liquid crystal display is relatively small, so that the liquid crystal display and the electronic device each have a more beautiful appearance, and a screen-to-body ratio is higher.

Optionally, a specific distance may be formed between the inner hole side part and the transparent region, to reduce a light leakage or uneven displaying on the liquid crystal display when unexpected peeling occurs on a part of the double-sided tape.

In an optional embodiment, the inner hole side part includes a main part and an extension part. The main part is connected between the bottom part and the extension part. The extension part is bent relative to the main part in a direction of being away from the transparent region or in a direction of approaching the transparent region. A width of a cross section that is of the extension part and that is parallel to the lower polarizer is greater than a width of a cross section that is of the main part and that is parallel to the lower polarizer. The double-sided tape is connected to the extension part.

In this embodiment, the double-sided tape is connected to the extension part, and the width of the cross section that is of the extension part and that is parallel to the lower polarizer is greater than the width of the cross section that is of the main part and that is parallel to the lower polarizer. Therefore, a connection area between the double-sided tape and the inner hole side part is larger, to reduce a risk of peeling of the double-sided tape, so that the liquid crystal display has higher reliability.

When the extension part is bent relative to the main part in the direction of approaching the transparent region, in other words, is bent in a direction of being away from the backlight film, the extension part does not occupy space of the accommodation space of the bracket. Therefore, the backlight film can fully use the accommodation space, to reduce an overall thickness of the backlight module, and facilitate lightness and thinness of the liquid crystal display and the electronic device.

When the extension part is bent relative to the main part in the direction of being away from the transparent region, in other words, is bent in a direction of approaching the backlight film, the extension part can reuse width space of the light shielding region with the bottom part. Therefore, a width of the light shielding region can be reduced while bonding reliability of the double-sided tape is ensured, so that the liquid crystal display and the electronic device each have a more beautiful appearance, and a screen-to-body ratio is higher.

In an optional embodiment, the light shielding part further includes a dispensing adhesive. The dispensing adhesive is located on a side that is of the inner hole side part and that is away from the outer peripheral side part, and is connected to the liquid crystal box, the double-sided tape, and the inner hole side part. The dispensing adhesive continuously surrounds the transparent region. In other words, the dispensing adhesive extends in a circumferential direction of the light shielding region. The dispensing adhesive is approximately annular. The dispensing adhesive may be made of a light shielding material. The dispensing adhesive may be a hot curing adhesive or a wet curing adhesive.

In this embodiment, because the dispensing adhesive is connected to the liquid crystal box, the double-sided tape, and the inner hole side part, the dispensing adhesive increases strength of bonding the liquid crystal box and the inner hole side part, to reduce a risk of peeling of the double-sided tape, so that the light shielding part has higher reliability.

In an optional embodiment, an inner side surface that is of the inner hole side part and that faces away from the outer peripheral side part is flush with the hole wall of the transparent hole. The light shielding part includes a double-sided tape and a dispensing adhesive. The double-sided tape is located between the lower polarizer and the inner hole side part. The double-sided tape bonds a lower surface that is of the lower polarizer and that faces away from the liquid crystal box and a top surface that is of the inner hole side part and that faces away from the bottom part. The double-sided tape is further bonded to the backlight film. The dispensing adhesive is located on a side that is of the inner hole side part and that faces away from the outer peripheral side part. The dispensing adhesive is connected to the inner hole side part, the double-sided tape, the hole wall of the transparent hole of the lower polarizer, and the liquid crystal box.

In this embodiment, the light shielding part uses the double-sided tape and the dispensing adhesive through combination, so that the backlight module and the liquid crystal display panel are more securely bonded, and a risk of peeling of the light shielding part is relatively low. In addition, the light shielding part can well shield light emitted from the backlight module and the lower polarizer to the transparent region, to avoid a light leakage on an edge of the liquid crystal display, so that the liquid crystal display has better display quality.

According to a second aspect, an embodiment of this application further provides another liquid crystal display.

The liquid crystal display includes a transparent region, a light shielding region surrounding a periphery of the transparent region, and a display region surrounding a periphery of the light shielding region.

The liquid crystal display includes an upper polarizer, a liquid crystal box, a lower polarizer, and a backlight module that are sequentially disposed in a stacked manner.

The upper polarizer covers the display region and is provided with a transparent hole, and a hole wall of the transparent hole is located in the light shielding region.

A part that is of the liquid crystal box and that is located in the transparent region is configured to allow visible light to pass through, a part that is of the liquid crystal box and that is located in the light shielding region is configured to shield visible light, and a part that is of the liquid crystal box and that is located in the display region is configured to display an image.

The lower polarizer continuously covers the transparent region, the light shielding region, and the display region.

The backlight module includes a bracket and a backlight film; the bracket includes an outer peripheral side part, an inner hole side part located on an inner side of the outer peripheral side part, and a bottom part connected between the outer peripheral side part and the inner hole side part; the outer peripheral side part, the inner hole side part, and the bottom part jointly form accommodation space; the backlight film is accommodated in the accommodation space and covers the display region; and the inner hole side part is located in the light shielding region.

The liquid crystal display further includes a light shielding part, the light shielding part is located in the light shielding region and continuously surrounds the transparent region, and the light shielding part is connected to the lower polarizer and the inner hole side part.

In this embodiment, because the upper polarizer is provided with the transparent hole that covers the transparent region, the transparent region of the liquid crystal display allows visible light to pass through. Therefore, the optical device of the electronic device can directly face the transparent region, and is placed below the transparent region, to transmit visible light by using the transparent region. In this way, there is no need to occupy lateral peripheral space of the liquid crystal display, so that a limitation of the optical device on arrangement space of the liquid crystal display is reduced; in addition, the transparent region is surrounded by the display region, so that a larger display region can be disposed on the liquid crystal display, to reduce a frame area of the electronic device, increase a display area of the electronic device, and increase a screen-to-body ratio of the electronic device.

Because the lower polarizer continuously covers the transparent region, the light shielding region, and the display region, the lower polarizer is a complete film, to avoid a light leakage of the lower polarizer in the transparent region. Because the light shielding part is connected to the lower polarizer and the inner hole side part, light of the backlight module does not escape from a part between the inner hole side part and a liquid crystal display panel to the transparent region, to avoid a light leakage and uneven displaying on a periphery of the transparent region of the liquid crystal display, and also help ensure working quality of the optical device.

Luminance is greatly weakened when light of the backlight module passes through the liquid crystal display panel, and a bonding layer located between the upper polarizer and the cover plate can quickly conduct and diffuse light. Therefore, there is almost no light leakage on the hole wall of the transparent hole of the upper polarizer, to ensure that the liquid crystal display has better display quality.

In an optional embodiment, the light shielding part includes a double-sided tape. The double-sided tape is located between the backlight module and the lower polarizer, and is connected to the backlight film, the inner hole side part, and the lower polarizer. The double-sided tape extends in a circumferential direction of the light shielding region. The double-sided tape is approximately annular. The double-sided tape may include a light shielding substrate and bonding layers located on two opposite sides of the substrate.

In this embodiment, the double-sided tape is connected to the backlight film, the inner hole side part, and the liquid crystal box, so that the backlight film is fastened to the bracket, and the backlight module is fastened to the liquid crystal display panel, and can shield light emitted from the backlight film, to reduce a risk of a light leakage on the liquid crystal display. Therefore, the liquid crystal display has a better display effect.

In an optional embodiment, the inner hole side part includes a main part and an extension part. The main part is connected between the bottom part and the extension part. The extension part is bent relative to the main part in a direction of being away from the transparent region or in a direction of approaching the transparent region. A width of a cross section that is of the extension part and that is parallel to the lower polarizer is greater than a width of a cross section that is of the main part and that is parallel to the lower polarizer. The double-sided tape is connected to the extension part.

In this application, the double-sided tape is connected to the extension part, and the width of the cross section that is of the extension part and that is parallel to the lower polarizer is greater than the width of the cross section that is of the main part and that is parallel to the lower polarizer. Therefore, a connection area between the double-sided tape and the inner hole side part is larger, to reduce a risk of peeling of the double-sided tape, so that the liquid crystal display has higher reliability.

When the extension part is bent relative to the main part in the direction of approaching the transparent region, in other words, is bent in a direction of being away from the backlight film, the extension part does not occupy space of the accommodation space of the bracket. Therefore, the backlight film can fully use the accommodation space, to reduce an overall thickness of the backlight module, and facilitate lightness and thinness of the liquid crystal display and the electronic device.

When the extension part is bent relative to the main part in the direction of being away from the transparent region, in other words, is bent in a direction of approaching the backlight film, the extension part can reuse width space of the light shielding region with the bottom part. Therefore, a width of the light shielding region can be reduced while bonding reliability of the double-sided tape is ensured, so that the liquid crystal display and the electronic device each have a more beautiful appearance, and a screen-to-body ratio is higher.

In an optional embodiment, the light shielding part includes a dispensing adhesive. The dispensing adhesive is located on a side that is of the inner hole side part and that is away from the outer peripheral side part, and is connected to the lower polarizer and the inner hole side part. The dispensing adhesive extends in a circumferential direction of the light shielding region. The dispensing adhesive is approximately annular. The dispensing adhesive may be made of a light shielding material. The dispensing adhesive may be a hot curing adhesive or a wet curing adhesive.

In this embodiment, the dispensing adhesive can be securely connected to the inner hole side part and the lower polarizer. Therefore, light of the backlight module does not escape from a part between the inner hole side part and a liquid crystal display panel to the transparent region, to avoid a light leakage and uneven displaying on a periphery of the transparent region of the liquid crystal display, and also help ensure working quality of the optical device.

According to a third aspect, an embodiment of this application further provides an electronic device. The electronic device includes a housing, an optical device, and the liquid crystal display according to any one of the foregoing items. The liquid crystal display is installed on the housing. An entire inner cavity is enclosed by the liquid crystal display and the housing together. The optical device is accommodated in the entire inner cavity and directly faces the transparent region. The optical device may be a camera module, an ambient light sensor, a proximity sensor, an optical fingerprint sensor, or the like.

In this embodiment, the liquid crystal display includes the transparent region, and the transparent region allows visible light to pass through. Therefore, the optical device of the electronic device can directly face the transparent region, and is placed below the transparent region, to transmit visible light by using the transparent region. In this way, there is no need to occupy lateral peripheral space of the liquid crystal display, so that a limitation of the optical device on arrangement space of the liquid crystal display is reduced; in addition, the transparent region is surrounded by the display region, so that a larger display region can be disposed on the liquid crystal display, to reduce a frame area of the electronic device, increase a display area of the electronic device, and increase a screen-to-body ratio of the electronic device.

Optionally, the electronic device may include one or more optical devices. The liquid crystal display may include one or more transparent regions. For example, the electronic device includes a plurality of optical devices, the liquid crystal display includes a plurality of transparent regions, and the plurality of optical devices directly face the plurality of transparent regions respectively, to transmit light by using the plurality of transparent regions. One transparent region may provide a light transmission channel for one optical device, or may provide light transmission channels for the plurality of optical devices.

According to a fourth aspect, an embodiment of this application further provides a liquid crystal display manufacturing method. The liquid crystal display manufacturing method may be used to manufacture the liquid crystal display.

The liquid crystal display manufacturing method includes:

providing a liquid crystal display panel, where the liquid crystal display panel includes a liquid crystal box and a lower polarizer fastened to the liquid crystal box, and the lower polarizer includes a transparent hole;

dispensing an adhesive on an inner side of the transparent hole to form a first adhesive part, where the first adhesive part is connected to a hole wall of the transparent hole and the liquid crystal box;

abutting against the liquid crystal display panel by using an inner hole side part of a backlight module, where the backlight module includes a bracket and a backlight film; the bracket includes an outer peripheral side part, the inner hole side part located on an inner side of the outer peripheral side part, and a bottom part connected between the outer peripheral side part and the inner hole side part; the outer peripheral side part, the inner hole side part, and the bottom part jointly form accommodation space; and the backlight film is accommodated in the accommodation space; and dispensing an adhesive on a side that is of the inner hole side part and that is away from the outer peripheral side part to form a second adhesive part, where the second adhesive part is connected to the first adhesive part and the inner hole side part. In this case, the second adhesive part and the first adhesive part form an integrated structure. The adhesive dispensing step in this step corresponds to a second adhesive dispensing process.

In this embodiment, the first adhesive part and the second adhesive part that are formed by using two mutually independent adhesive dispensing processes can be stacked into the integrated structure, to form the light shielding part, so that the light shielding part has a smaller cross-sectional area (parallel to a direction of the lower polarizer) and a larger height size (perpendicular to the direction of the lower polarizer). Therefore, the lower polarizer and the backlight module are better bonded, and the light shielding region is relatively narrow.

In an optional embodiment, in the process of dispensing an adhesive on an inner side of the transparent hole to form a first adhesive part, an adhesive dispensing plane of an adhesive dispensing pin configured to dispense an adhesive is parallel to the lower polarizer. In this case, a cross-sectional shape of the first adhesive part is approximately rectangular. A surface that is of the first adhesive part and that is away from the lower polarizer can be approximately parallel to the lower polarizer, so that an appropriate molding surface can be provided for an adhesive dispensing process of the second adhesive part. Therefore, the second adhesive part has better molding quality, and the light shielding part has higher reliability. The adhesive dispensing pin may be translated around the transparent hole along an extension direction of the hole wall of the transparent hole, to form the first adhesive part that is continuous and approximately annular.

In an optional embodiment, in the process of dispensing an adhesive on a side that is of the inner hole side part and that is away from the outer peripheral side part to form a second adhesive part, the adhesive dispensing plane of the adhesive dispensing pin configured to dispense an adhesive is inclined relative to the lower polarizer. For example, an included angle of 30° to 60° (for example, 45°) may be formed between the adhesive dispensing plane of the adhesive dispensing pin and the lower polarizer. A needle of the adhesive dispensing pin faces a corner of an included angle between the first adhesive part and the inner hole side part. Because the adhesive dispensing plane of the adhesive dispensing pin is inclined relative to the lower polarizer, an adhesive flowing out of the adhesive dispensing pin can better flow into the corner of the included angle between the first adhesive part and the inner hole side part, so that the second adhesive part can better bond the first adhesive part and the inner hole side part, and the backlight module and the liquid crystal display panel are more securely connected. The second adhesive part can form a second surface that is inclined relative to the first adhesive part. The second surface is away from the transparent region relative to the first surface, and the second surface is gradually away from the transparent region in a direction of being away from the first adhesive part. The adhesive dispensing pin may rotate around a central axis of the transparent hole, to form the second adhesive part that is continuous and approximately annular.

DETAILED DESCRIPTION OF ILLUSTRATIVE EMBODIMENTS

The following describes implementations of this application with reference to the accompanying drawings in the implementations of this application.

Figure 1:
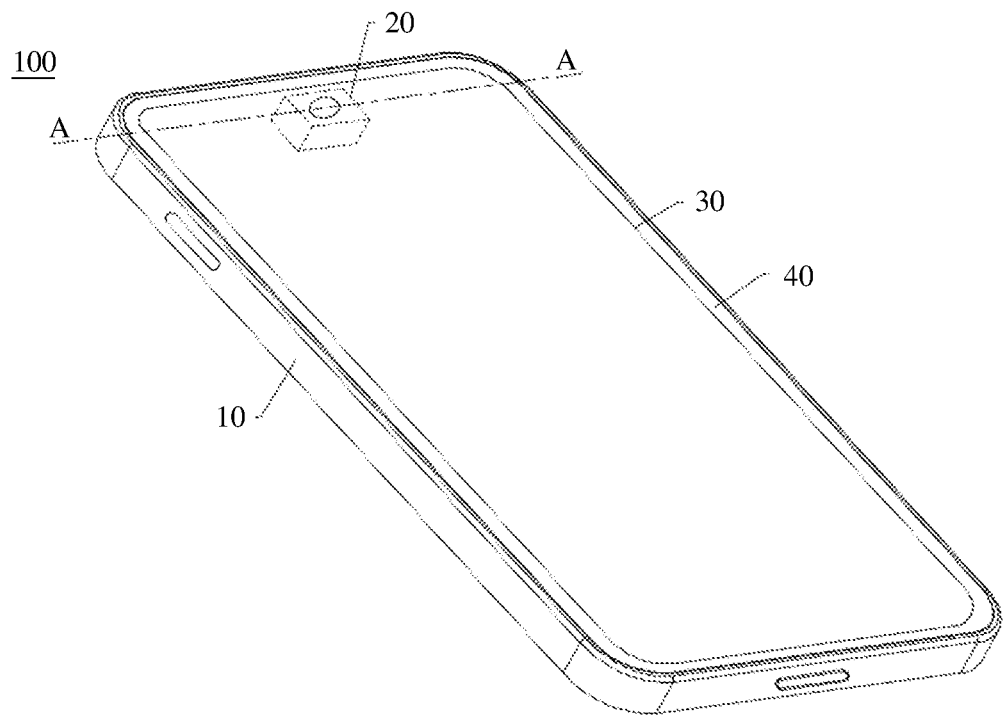
FIG. 1 is a schematic structural diagram of an electronic device according to an embodiment of this application.
Figure 2A:
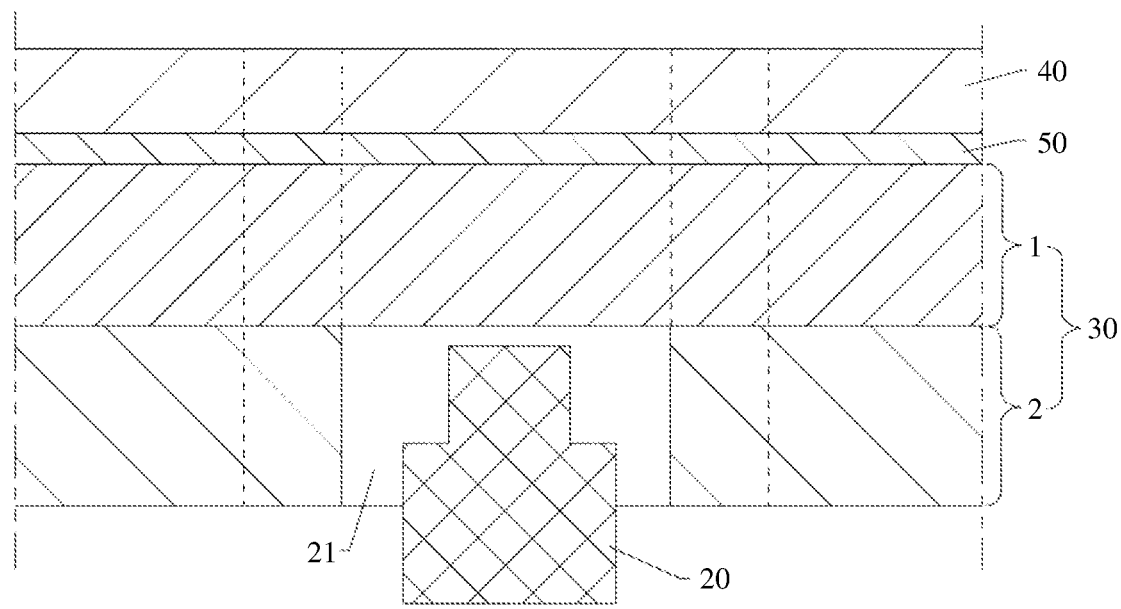
FIG. 2A is a schematic structural diagram of a part of a structure of the electronic device shown in FIG. 1 at a line A-A.
Figure 2B:
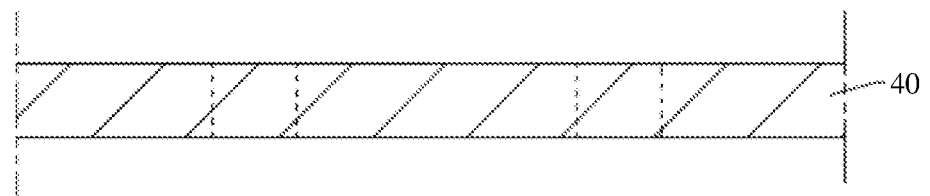
FIG. 2B is a schematic exploded view of a part of the structure shown in FIG. 2A.
Figure 2B:
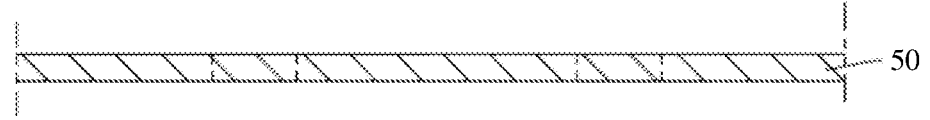
Figure 2B:
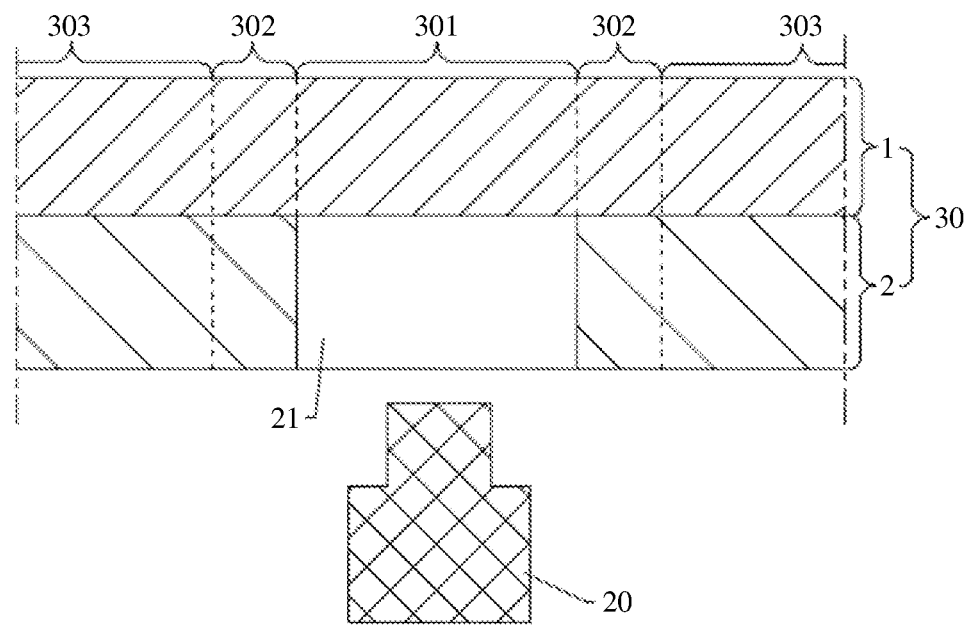

FIG. 1 is a schematic structural diagram of an electronic device 100 according to an embodiment of this application. FIG. 2A is a schematic structural diagram of a part of a structure of the electronic device 100 shown in FIG. 1 at a line A-A. FIG. 2B is a schematic exploded view of a part of the structure shown in FIG. 2A.

The electronic device 100 may be a device such as a mobile phone, a tablet computer, an electronic reader, a notebook computer, a vehicle-mounted device, or a wearable device. In the embodiment shown in FIG. 1, an example in which the electronic device 100 is the mobile phone is used for description.

The electronic device 100 includes a housing 10, an optical device 20, and a liquid crystal display (Liquid Crystal Display, LCD) 30. The liquid crystal display 30 is installed on the housing 10. The housing 10 may include a frame and a rear cover. The frame is disposed around a periphery of the rear cover. The liquid crystal display 30 is disposed on a side that is of the frame and that is away from the rear cover. An entire inner cavity is enclosed by the liquid crystal display 30 and the housing 10 together. The optical device 20 is accommodated in the entire inner cavity. The optical device 20 may be a camera module, an ambient light sensor, a proximity sensor, an optical fingerprint sensor, or the like.

The liquid crystal display 30 includes a transparent region 301, a light shielding region 302 surrounding a periphery of the transparent region 301, and a display region 303 surrounding a periphery of the light shielding region 302. The transparent region 301 allows visible light to pass through. The light shielding region 302 is configured to shield visible light. The display region 303 is configured to display an image. The optical device 20 directly faces the transparent region 301.

In this embodiment, the liquid crystal display 30 includes the transparent region 301, and the transparent region 301 allows visible light to pass through. Therefore, the optical device 20 (for example, the camera module, the ambient light sensor, or the optical fingerprint sensor that recognizes visible light) that uses visible light as recognition light and that is of the electronic device 100 can directly face the transparent region 301, and is placed below the transparent region 301, to transmit visible light by using the transparent region 301. In this way, there is no need to occupy lateral peripheral space of the liquid crystal display 30, so that a limitation of the optical device 20 on arrangement space of the liquid crystal display 30 is reduced; in addition, the transparent region 301 is surrounded by the display region 303, so that a larger display region 303 can be disposed on the liquid crystal display 30, to reduce a frame area of the electronic device 100, increase a display area of the electronic device 100, and increase a screen-to-body ratio of the electronic device 100.

It may be understood that in a conventional liquid crystal display, a film layer or a plate that allows visible light to pass through also allows invisible light to pass through. In this application, a material of a film layer or a plate that is of the liquid crystal display 30 and that is located in the transparent region 301 may be designed with reference to a conventional solution. Because the transparent region 301 allows visible light to pass through, the transparent region 301 also allows invisible light to pass through. In this application, an optical device 20 (for example, a proximity sensor or an optical fingerprint sensor that recognizes invisible light) that uses invisible light as recognition light can also directly face the transparent region 301, and can be placed below the transparent region 301, to transmit invisible light by using the transparent region 301.

In this application, the electronic device 100 may include one or more optical devices 20. The liquid crystal display 30 may include one or more transparent regions 301. For example, the electronic device 100 includes a plurality of optical devices 20, the liquid crystal display 30 includes a plurality of transparent regions 301, and the plurality of optical devices 20 directly face the plurality of transparent regions 301 respectively, to transmit light by using the plurality of transparent regions 301. One transparent region 301 may provide a light transmission channel for one optical device 20, or may provide light transmission channels for the plurality of optical devices 20.

Optionally, the electronic device 100 further includes a cover plate 40. The cover plate 40 is located on a side that is of the liquid crystal display 30 and that is away from the entire inner cavity. The liquid crystal display 30 may be bonded to the cover plate 40 by using a bonding layer 50, to jointly form a screen assembly. The bonding layer 50 may be made of an optically clear adhesive (Optically Clear Adhesive, OCA) material.

In this application, a transparent region of the screen assembly corresponds to and coincides with the transparent region 301 of the liquid crystal display 30 of the screen assembly. A display region of the screen assembly corresponds to and coincides with the display region 303 of the liquid crystal display 30 of the screen assembly.

Optionally, the liquid crystal display 30 includes a liquid crystal display panel 1 and a backlight module 2 (backlight module). A part that is of the liquid crystal display panel 1 and that is located in the transparent region 301 is configured to allow visible light to pass through. A part that is of the liquid crystal display panel 1 and that is located in the light shielding region 302 is configured to shield visible light. A part that is of the liquid crystal display panel 1 and that is located in the display region 303 is configured to display an image. The backlight module 2 is configured to provide a backlight source for the liquid crystal display panel 1. A part that is of the backlight module 2 and that is located in the transparent region 301 allows visible light to pass through.

In this embodiment, the part that is of the backlight module 2 and that is located in the transparent region 301 is a through hole 21. The optical device 20 may be partially or completely accommodated in the through hole 21, so that the optical device 20 and the liquid crystal display 30 are arranged more compactly, and can reuse space in a thickness direction (a direction perpendicular to the liquid crystal display 30) of the electronic device 100, to facilitate lightness and thinness of the electronic device 100.

In another embodiment, the part that is of the backlight module 2 and that is located in the transparent region 301 may be made of a light guide material. The light guide material may be a transparent material. The optical device 20 is located on a side that is of the transparent part and that is away from the liquid crystal display panel 1.

Figure 3:
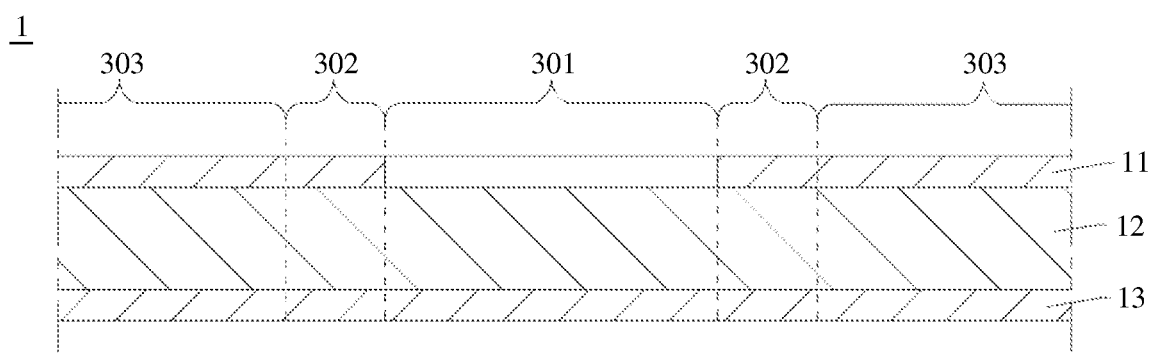
FIG. 3 is a schematic structural diagram of a liquid crystal display panel of a liquid crystal display shown in FIG. 2B in an implementation.
Figure 4:
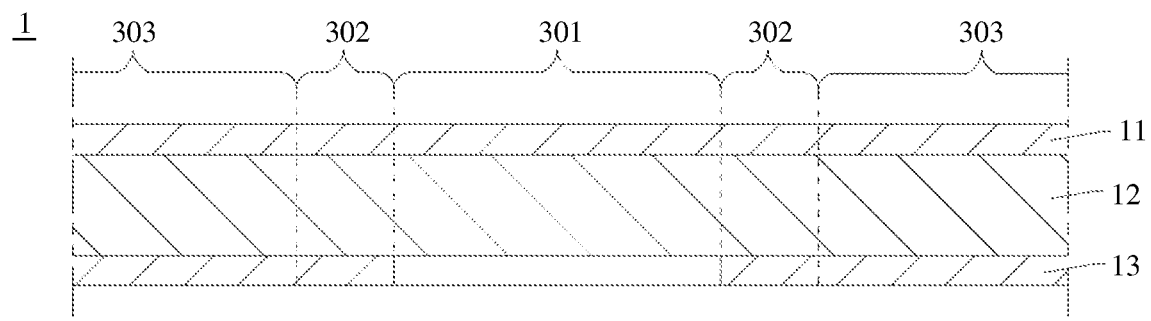
FIG. 4 is a schematic structural diagram of a liquid crystal display panel of a liquid crystal display shown in FIG. 2B in another implementation.
Figure 5:
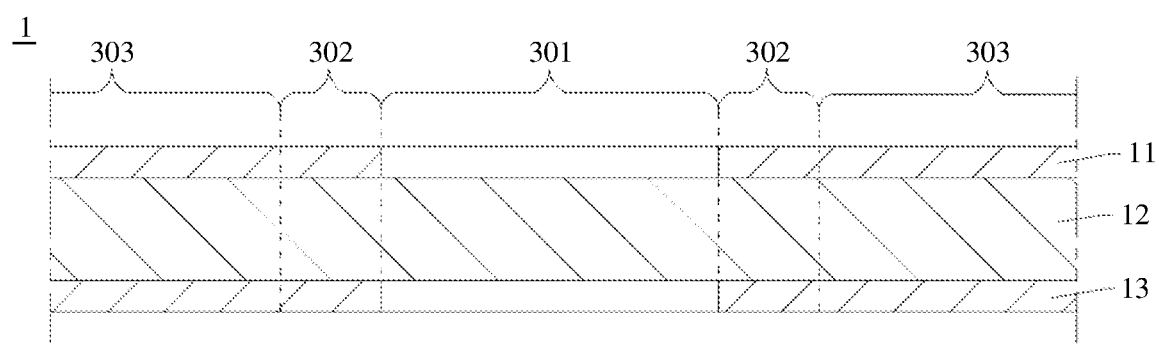
FIG. 5 is a schematic structural diagram of a liquid crystal display panel of a liquid crystal display shown in FIG. 2B in still another implementation.

FIG. 3 is a schematic structural diagram of the liquid crystal display panel 1 of the liquid crystal display 30 shown in FIG. 2B in an implementation. FIG. 4 is a schematic structural diagram of the liquid crystal display panel 1 of the liquid crystal display 30 shown in FIG. 2B in another implementation. FIG. 5 is a schematic structural diagram of the liquid crystal display panel 1 of the liquid crystal display 30 shown in FIG. 2B in still another implementation.

The liquid crystal display panel 1 includes an upper polarizer 11, a liquid crystal box 12, and a lower polarizer 13 that are sequentially disposed in a stacked manner. In other words, the upper polarizer 11 and the lower polarizer 13 are respectively stacked on two opposite sides of the liquid crystal box 12. The upper polarizer 11 is located between the cover plate 40 and the liquid crystal box 12. The lower polarizer 13 is located between the liquid crystal box 12 and the backlight module 2.

A part that is of the liquid crystal box 12 and that is located in the transparent region 301 is configured to allow visible light to pass through. A part that is of the liquid crystal box 12 and that is located in the light shielding region 302 is configured to shield visible light. A part that is of the liquid crystal box 12 and that is located in the display region 303 is configured to display an image.

A polarization axis of the upper polarizer 11 is perpendicular to a polarization axis of the lower polarizer 13. At least one of the upper polarizer 11 and the lower polarizer 13 is hollowed out in the transparent region 301. To be specific, the upper polarizer 11 is hollowed out in the transparent region 301 (as shown in FIG. 3), or the lower polarizer 13 is hollowed out in the transparent region 301 (as shown in FIG. 4), or both the upper polarizer 11 and the lower polarizer 13 are hollowed out in the transparent region 301 (as shown in FIG. 5). In this case, a part of the liquid crystal display panel 1 in the transparent region 301 allows visible light to pass through. When both the upper polarizer 11 and the lower polarizer 13 are hollowed out in the transparent region 301, a transparency rate of the transparent region 301 is higher, and working quality of the optical device 20 is improved.

It may be understood that when recognition light of the optical device 20 is visible light, the liquid crystal display panel 1 may use a structure shown in FIG. 5. In this case, a transparency rate of the transparent region 301 is higher, so that the optical device 20 has better working quality. When recognition light of the optical device 20 is invisible light, the liquid crystal display panel 1 may use a structure shown in FIG. 3 or FIG. 4. An optical device 20 that uses invisible light as recognition light has a relatively low requirement on transmittance. Therefore, the device requirement can be met provided that the upper polarizer 11 or the lower polarizer 13 is provided with a hole. Certainly, in another embodiment, the optical device 20 may cooperate with the liquid crystal display panel 1 in another manner. This is not strictly limited in this application.

The liquid crystal box 12 includes an array substrate and a color film substrate that are disposed oppositely, and a liquid crystal layer located between the array substrate and the color film substrate. The liquid crystal box 12 may be provided with a black matrix (black matrix, BM) or a light shielding layer on a part that is of either of or both the array substrate and the color film substrate and that is located in the light shielding region 302, so that the light shielding region 302 can shield visible light. The black matrix or the light shielding layer may be further configured to cover a signal line in the liquid crystal box 12.

In an implementation, the array substrate may include a first substrate and a device array layer formed on the first substrate. The device array layer includes a plurality of thin film transistors (thin film transistor, TFT) disposed in an array. The color film substrate includes a second substrate and a color filter (color filter, CF) layer formed on the second substrate. The color filter layer is configured to allow light in a specific band range to pass through. Both a part that is of the device array layer and that is located in the transparent region 301 and a part that is of the color filter layer and that is located in the transparent region 301 allow visible light to pass through.

In this embodiment, the first substrate and the second substrate each are made of a transparent material (for example, a glass material), and continuously cover the transparent region 301, the light shielding region 302, and the display region 303. Therefore, the first substrate and the second substrate each may be a continuous plate on an entire surface, and have sufficient structural strength, so that the liquid crystal display panel 1 has relatively high overall strength and is not easily broken. In this application, because the liquid crystal display panel 1 has relatively high strength, designs of a shape, a size, and a quantity that are of the transparent region 301 of the liquid crystal display 30 and a distance between the transparent region 301 of the liquid crystal display 30 and an edge of the liquid crystal display 30 are more flexible and diversified, to help improve overall reliability of the electronic device 100. For example, the shape of the transparent region 301 may be a circle, an ellipse, a polygon, a rounded rectangle, a runway shape (including two straight edges that are parallel to each other and are edges that are oppositely connected between the two straight edges), or the like. A specific shape of the transparent region 301 is not strictly limited in this application. There may be one or more transparent regions 301. A plurality of transparent regions 301 may respectively provide light transmission channels for a plurality of optical devices 20. An arrangement manner of the plurality of transparent regions 301 may be flexibly designed, for example, an array arrangement or a ring arrangement.

Optionally, the liquid crystal display 30 may integrate a touch function. For example, the liquid crystal display 30 may further include a touch layer (not shown in the figure). The touch layer may be located between the upper polarizer 11 and the liquid crystal box 12, in the liquid crystal box 12, or between the liquid crystal box 12 and the upper polarizer 11. In another embodiment, a touch film layer (not shown in the figure) may alternatively be disposed between the cover plate 40 and the liquid crystal display 30, so that the screen assembly integrates a touch function.

Figure 6:
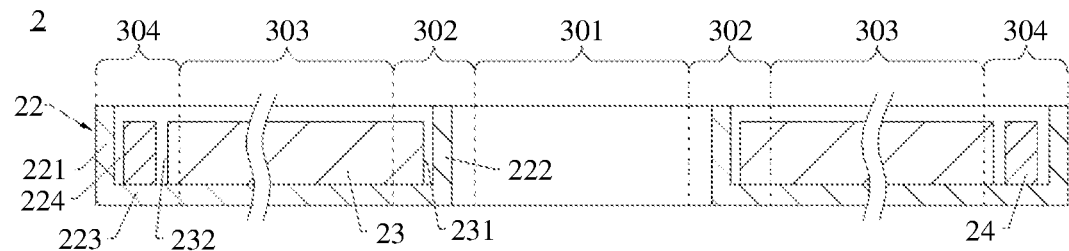
FIG. 6 is a schematic structural diagram of a backlight module of a liquid crystal display shown in FIG. 2B.

FIG. 6 is a schematic structural diagram of the backlight module 2 of the liquid crystal display 30 shown in FIG. 2B.

The backlight module 2 includes a bracket 22 and a backlight film 23. The bracket 22 includes an outer peripheral side part 221, an inner hole side part 222 located on an inner side of the outer peripheral side part 221, and a bottom part 223 connected between the outer peripheral side part 221 and the inner hole side part 222. The outer peripheral side part 221 and the inner hole side part 222 are approximately disposed oppositely, and are both substantially erected relative to the bottom part 223. The outer peripheral side part 221, the inner hole side part 222, and the bottom part 223 jointly form accommodation space 224. The outer peripheral side part 221 surrounds the display region 303. The liquid crystal display 30 may further include a cabling region 304 surrounding the display region 303. The cabling region 304 shields visible light. The outer peripheral side part 221 may be located in the cabling region 304. The inner hole side part 222 is located in the light shielding region 302. A structure of a through hole (including the through hole 21 shown in FIG. 2A) that covers the transparent region 301 is formed on a side that is of the inner hole side part 222 and that is away from the outer peripheral side part 221, to allow visible light to pass through. The backlight film 23 is accommodated in the accommodation space 224 and covers the display region 303. The backlight film 23 is provided with a through hole. When the backlight film 23 is installed on the bracket 22, the inner hole side part 222 extends into the through hole. An edge 231 (namely, a hole wall of the through hole) that is of the backlight film 23 and that is close to the inner hole side part 222 may be located in the light shielding region 302. An edge 232 that is of the backlight film 23 and that is close to the outer peripheral side part 221 may be located in the cabling region 304.

Optionally, the outer peripheral side part 221, the inner hole side part 222, and the bottom part 223 are integrally formed. In other words, the bracket 22 is integrally formed. The bracket 22 may be formed through mechanical processing such as board stamping. The bracket 22 may be made of a metal material such as iron, stainless steel, or aluminum. In this case, a processing manner of the bracket 22 is simple, difficulty is low, and processing costs are relatively low. In another embodiment, the parts of the bracket 22 may alternatively form an integrated structure in an assembly manner.

Optionally, the backlight film 23 includes a light guide plate and a group of films stacked on the light guide plate. The group of films is located on a side that is of the light guide plate and that is away from the bottom part 223. The light guide plate may use polymethyl methacrylate (polymethyl methacrylate, PMMA) or polycarbonate (polycarbonate, PC) as a base material. The group of films may include a protector (protector), a diffuser (diffuser), a prism film (prism film), or another optical film. A type, a quantity, and a stacking location that are of the optical film in the group of films are not strictly limited in this application.

Optionally, the backlight module 2 further includes a light source 24. As shown in FIG. 6, in an implementation, the backlight module 2 is a side-entry backlight source. The light source 24 may be located between the backlight film 23 and the outer peripheral side part 221. The backlight film 23 further includes a reflector sheet. The reflector sheet is located between the light guide plate and the bottom part 223. In another implementation, the backlight module 2 may be a straight-down backlight source. In this case, the light source 24 may be located between the light guide plate and the bottom part 223.

Figure 7:
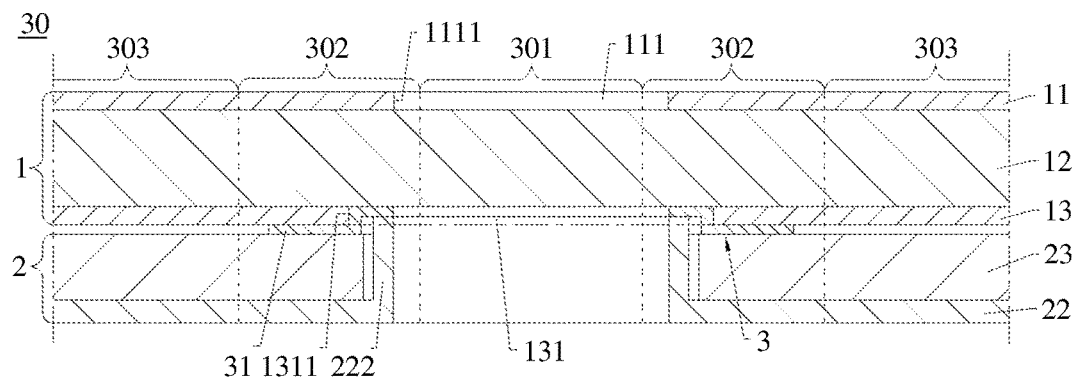
FIG. 7 is a schematic structural diagram of a liquid crystal display shown in FIG. 2B in a first embodiment.

FIG. 7 is a schematic structural diagram of the liquid crystal display 30 shown in FIG. 2B in a first embodiment.

The liquid crystal display 30 includes the liquid crystal box 12, the lower polarizer 13, and the backlight module 2 that are sequentially disposed in a stacked manner. The lower polarizer 13 covers the display region 303 and is provided with a transparent hole 131. A hole wall 1311 of the transparent hole 131 is located in the light shielding region 302. In this case, the transparent hole 131 covers the transparent region 301, so that visible light can pass through the transparent region 301, and the optical device 20 can transmit light by using the transparent region 301.

The liquid crystal display 30 further includes a light shielding part 3. The light shielding part 3 can shield visible light. The light shielding part 3 is located in the light shielding region 302 and continuously surrounds the transparent region 301. The light shielding part 3 is connected to the liquid crystal box 12, the hole wall 1311 of the transparent hole 131, and the inner hole side part 222.

In this embodiment, because the light shielding part 3 is connected to the hole wall 1311 of the transparent hole 131, the liquid crystal box 12, and the inner hole side part 222, the light shielding part 3 can shield visible light. Therefore, light of the backlight module 2 does not escape from the hole wall 1311 of the transparent hole 131 or a part between the inner hole side part 222 and the liquid crystal box 12 to the transparent region 301, to avoid a light leakage and uneven displaying on a periphery of the transparent region 301 of the liquid crystal display 30, and also help ensure working quality of the optical device 20. In addition, a light leakage at a large angle of view does not occur when the light that is of the backlight module 2 and that enters the lower polarizer 13 is emitted from the hole wall 1311 of the transparent hole 131, so that the liquid crystal display 30 has better display quality.

It may be understood that the "light leakage at a large angle of view" means that when a user watches the liquid crystal display 30 from a relatively large angle of view or a relatively inclined angle, light leaked from the hole wall 1311 of the transparent hole 131 of the lower polarizer 13 may be watched by the user by using the transparent region 301. The light leakage at a large angle of view affects display quality of the liquid crystal display 30, and consequently user experience is reduced.

As shown in FIG. 7, the light shielding part 3 includes a double-sided tape 31. The double-sided tape 31 is located between the backlight module 2 and the liquid crystal box 12, and is connected to the backlight film 23, the hole wall 1311 of the transparent hole 131, the inner hole side part 222, and the liquid crystal box 12. The double-sided tape 31 continuously surrounds the transparent region 301. In other words, the double-sided tape 31 extends in a circumferential direction of the light shielding region 302. The double-sided tape 31 is approximately annular (including but not limited to a ring that has the same contour shape as the transparent region 301 such as a circular ring, a square ring, or a runway ring). The double-sided tape 31 may include a light shielding substrate and bonding layers located on two opposite sides of the substrate.

In this embodiment, the double-sided tape 31 is connected to the backlight film 23, the hole wall 1311 of the transparent hole 131, the inner hole side part 222, and the liquid crystal box 12, so that the backlight film 23 is fastened to the bracket 22, and the backlight module 2 is fastened to the liquid crystal display panel 1, and can shield light emitted from the hole wall 1311 of the transparent hole 131 and light emitted from the backlight film 23, to reduce a risk of a light leakage on the liquid crystal display 30. Therefore, the liquid crystal display 30 has a better display effect.

In this embodiment, a width of the double-sided tape 31 is relatively small, and a width of the light shielding region 302 of the liquid crystal display 30 is relatively small, so that the liquid crystal display 30 and the electronic device 100 each have a more beautiful appearance, and a screen-to-body ratio is higher.

It may be understood that in this embodiment, a specific distance may be formed between the inner hole side part 222 and the transparent region 301, to reduce a light leakage or uneven displaying on the liquid crystal display 30 when unexpected peeling occurs on a part of the double-sided tape 31.

In an embodiment, a width of the light shielding region 302 is usually between 0.3 millimeter (mm) and 1.5 millimeters, and may be adjusted based on a design requirement. When the light shielding region 302 is wider, the double-sided tape 31 may also be wider, to ensure that the double-sided tape 31 has sufficient adhesion force, so that the liquid crystal display 30 has higher reliability. A width of the inner hole side part 222 is usually approximately 0.1 millimeter, and may be adjusted based on a design requirement. When the inner hole side part 222 is wider, a bonding area between the double-sided tape 31 and the inner hole side part 222 may also be larger, to ensure that the double-sided tape 31 and the inner hole side part 222 have sufficient adhesion force, so that the liquid crystal display 30 has higher reliability.

Optionally, the liquid crystal display panel 1 further includes the upper polarizer 11 located on a side that is of the liquid crystal box 12 and that is away from the lower polarizer 13. The upper polarizer 11 covers the display region 303 and is provided with a transparent hole 11. A hole wall 1111 of the transparent hole 11 is located in the light shielding region 302. The transparent hole 111 covers the transparent region 301. In this case, a transparency rate of the transparent region 301 of the liquid crystal display 30 is higher, so that the optical device 20 has better working quality.

With reference to FIG. 2A and FIG. 7, luminance is greatly weakened when light of the backlight module 2 passes through the liquid crystal display panel 1, and the bonding layer 50 located between the upper polarizer 11 and the cover plate 40 can quickly conduct and diffuse light. Therefore, there is almost no light leakage on the hole wall 111 of the transparent hole 111 of the upper polarizer 11, to ensure that the liquid crystal display 30 has better display quality.

In another embodiment, the upper polarizer 11 may be not provided with a hole. To be specific, the upper polarizer 11 continuously covers the transparent region 301, the light shielding region 302, and the display region 303.

Figure 8:
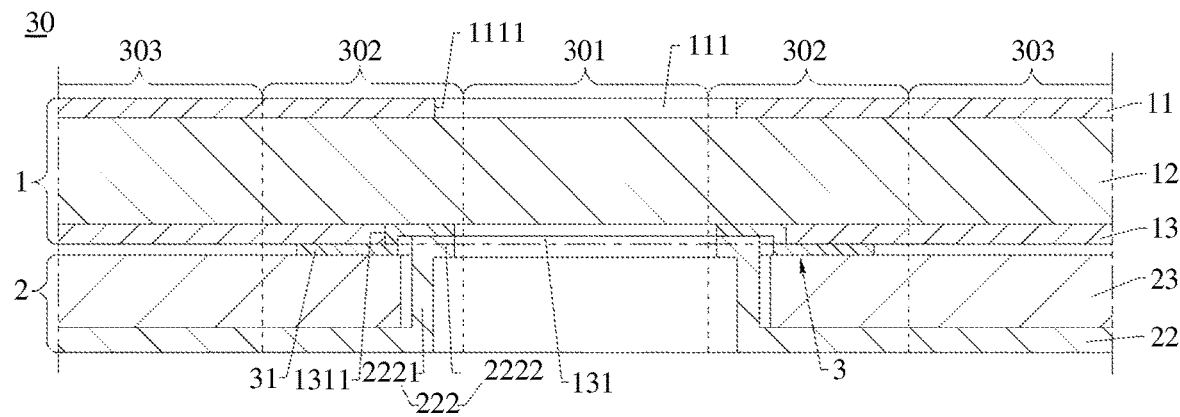
FIG. 8 is a schematic structural diagram of a liquid crystal display shown in FIG. 2B in a second embodiment.

FIG. 8 is a schematic structural diagram of the liquid crystal display 30 shown in FIG. 2B in a second embodiment. Most technical content in this embodiment that is the same as that in the foregoing embodiment is not described again.

The inner hole side part 222 includes a main part 2221 and an extension part 2222. The main part 2221 is connected between the bottom part 223 and the extension part 2222. The main part 2221 and the extension part 2222 may be integrally formed. The extension part 2222 is bent relative to the main part 2221 in a direction of approaching the transparent region 301. A width of a cross section that is of the extension part 2222 and that is parallel to the lower polarizer 13 is greater than a width of a cross section that is of the main part 2221 and that is parallel to the lower polarizer 13. The double-sided tape 31 is connected to the extension part 2222.

In this embodiment, the double-sided tape 31 is connected to the extension part 2222, and the width of the cross section that is of the extension part 2222 and that is parallel to the lower polarizer 13 is greater than the width of the cross section that is of the main part 2221 and that is parallel to the lower polarizer 13. Therefore, a connection area between the double-sided tape 31 and the inner hole side part 222 is larger, to reduce a risk of peeling of the double-sided tape 31, so that the liquid crystal display 30 has higher reliability. Because the extension part 2222 is bent relative to the main part 2221 in the direction of approaching the transparent region 301, the extension part 2222 does not occupy space of the accommodation space 224 of the bracket 22. Therefore, the backlight film 23 can fully use the accommodation space 224, to reduce an overall thickness of the backlight module 2, and facilitate lightness and thinness of the liquid crystal display 30 and the electronic device 100.

Figure 9:
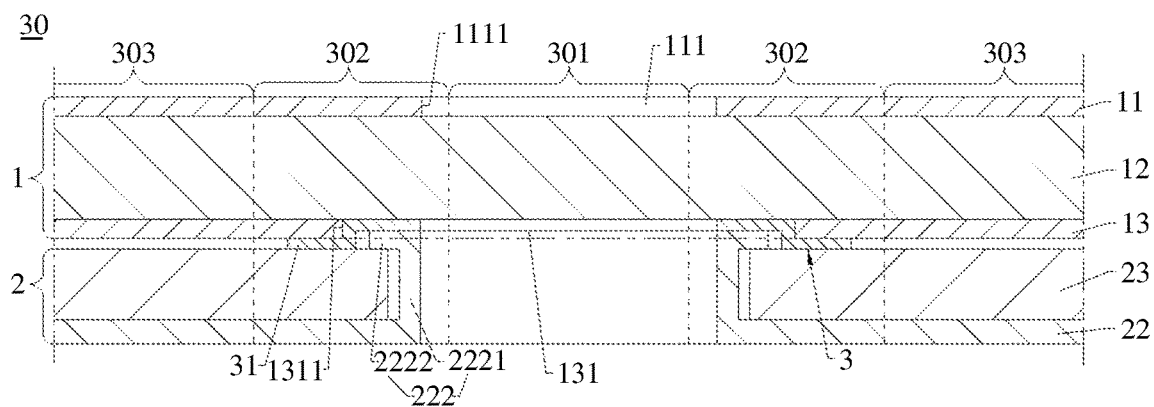
FIG. 9 is a schematic structural diagram of a liquid crystal display shown in FIG. 2B in a third embodiment.

FIG. 9 is a schematic structural diagram of the liquid crystal display 30 shown in FIG. 2B in a third embodiment. Most technical content in this embodiment that is the same as that in the foregoing embodiment is not described again.

The inner hole side part 222 includes a main part 2221 and an extension part 2222. The main part 2221 is connected between the bottom part 223 and the extension part 2222. The main part 2221 and the extension part 2222 may be integrally formed. The extension part 2222 is bent relative to the main part 2221 in a direction of being away from the transparent region 301. A width of a cross section that is of the extension part 2222 and that is parallel to the lower polarizer 13 is greater than a width of a cross section that is of the main part 2221 and that is parallel to the lower polarizer 13. The double-sided tape 31 is connected to the extension part 2222.

In this embodiment, the double-sided tape 31 is connected to the extension part 2222, and the width of the cross section that is of the extension part 2222 and that is parallel to the lower polarizer 13 is greater than the width of the cross section that is of the main part 2221 and that is parallel to the lower polarizer 13. Therefore, a connection area between the double-sided tape 31 and the inner hole side part 222 is larger, to reduce a risk of peeling of the double-sided tape 31, so that the liquid crystal display 30 has higher reliability. Because the extension part 2222 is bent relative to the main part 2221 in the direction of being away from the transparent region 301, in other words, is bent in a direction of approaching the backlight film 23, the extension part 2222 can reuse width space of the light shielding region 302 with the bottom part 223. Therefore, a width of the light shielding region 302 can be reduced while bonding reliability of the double-sided tape 31 is ensured, so that the liquid crystal display 30 and the electronic device 100 each have a more beautiful appearance, and a screen-to-body ratio is higher.

Figure 10:
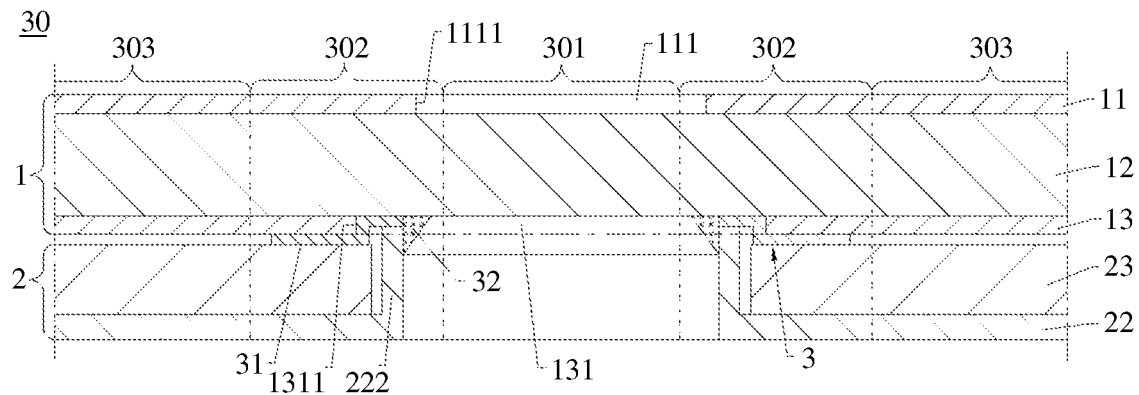
FIG. 10 is a schematic structural diagram of a liquid crystal display shown in FIG. 2B in a fourth embodiment.

FIG. 10 is a schematic structural diagram of the liquid crystal display 30 shown in FIG. 2B in a fourth embodiment. Most technical content in this embodiment that is the same as that in the foregoing embodiment is not described again.

The light shielding part 3 further includes a dispensing adhesive 32. The dispensing adhesive 32 is located on a side that is of the inner hole side part 222 and that is away from the outer peripheral side part 221, and is connected to the liquid crystal box 12, the double-sided tape 31, and the inner hole side part 222. The dispensing adhesive 32 continuously surrounds the transparent region 301. In other words, the dispensing adhesive 32 extends in a circumferential direction of the light shielding region 302. The dispensing adhesive 32 is approximately annular. The dispensing adhesive 32 may be made of a light shielding material. The dispensing adhesive 32 may be a hot curing adhesive or a wet curing adhesive.

In this embodiment, because the dispensing adhesive 32 is connected to the liquid crystal box 12, the double-sided tape 31, and the inner hole side part 222, the dispensing adhesive 32 increases strength of bonding the liquid crystal box 12 and the inner hole side part 222, to reduce a risk of peeling of the double-sided tape 31, so that the light shielding part 3 has higher reliability.

For a structure of the double-sided tape 31 in the embodiment shown in FIG. 10, refer to related descriptions in the embodiment shown in FIG. 7. In another embodiment, the dispensing adhesive 32 may alternatively cooperate with the double-sided tape 31 in the embodiment shown in FIG. 8 or the embodiment shown in FIG. 9, to form the light shielding part 3.

Figure 11:
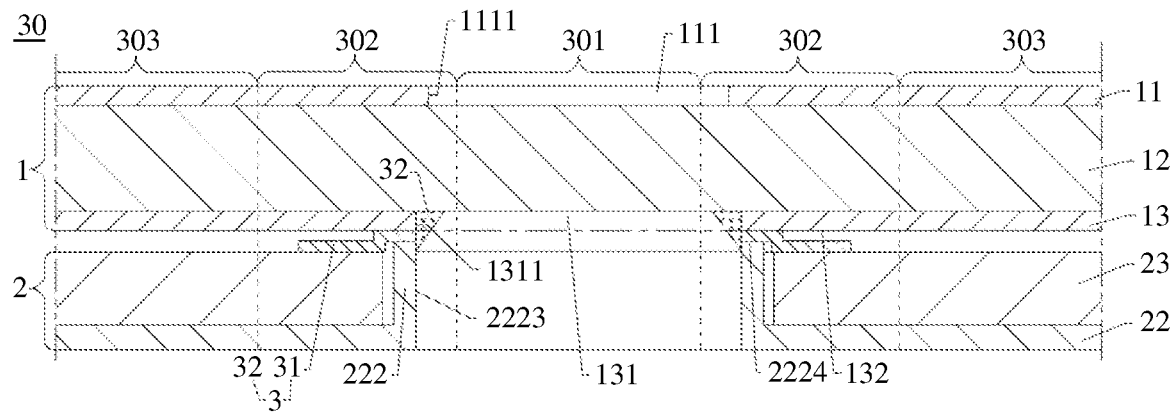
FIG. 11 is a schematic structural diagram of a liquid crystal display shown in FIG. 2B in a fifth embodiment.

FIG. 11 is a schematic structural diagram of the liquid crystal display 30 shown in FIG. 2B in a fifth embodiment. Most technical content in this embodiment that is the same as that in the foregoing embodiment is not described again.

An inner side surface 2223 that is of the inner hole side part 222 and that faces away from the outer peripheral side part 221 (referring to FIG. 6) is flush with the hole wall 1311 of the transparent hole 131. The light shielding part 3 includes a double-sided tape 31 and a dispensing adhesive 32. The double-sided tape 31 is located between the lower polarizer 13 and the inner hole side part 222. The double-sided tape 31 bonds a lower surface 132 that is of the lower polarizer 13 and that faces away from the liquid crystal box 12 and a top surface 2224 that is of the inner hole side part 222 and that faces away from the bottom part 223. The double-sided tape 31 is further bonded to the backlight film 23. The dispensing adhesive 32 is located on a side that is of the inner hole side part 222 and that faces away from the outer peripheral side part 221. The dispensing adhesive 32 is connected to the inner hole side part 222, the double-sided tape 31, the hole wall 1311 of the transparent hole 131 of the lower polarizer 13, and the liquid crystal box 12.

In this embodiment, the light shielding part 3 uses the double-sided tape 31 and the dispensing adhesive 32 through combination, so that the backlight module 2 and the liquid crystal display panel 1 are more securely bonded, and a risk of peeling of the light shielding part 3 is relatively low. In addition, the light shielding part 3 can well shield light emitted from the backlight module 2 and the lower polarizer 13 to the transparent region 301, to avoid a light leakage on an edge of the liquid crystal display 30, so that the liquid crystal display 30 has better display quality.

Figure 12:
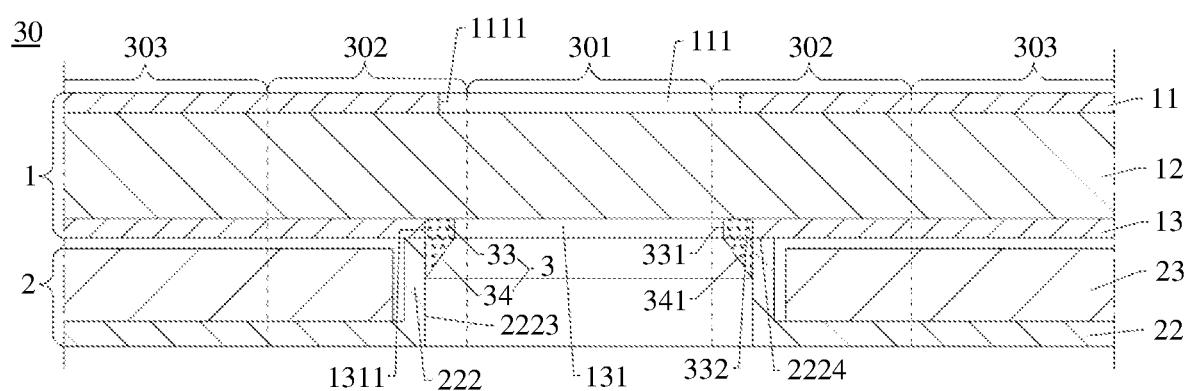
FIG. 12 is a schematic structural diagram of a liquid crystal display shown in FIG. 2B in a fifth embodiment.

FIG. 12 is a schematic structural diagram of the liquid crystal display 30 shown in FIG. 2B in a fifth embodiment. Most technical content in this embodiment that is the same as that in the foregoing embodiment is not described again.

The light shielding part 3 includes a first adhesive part 33 formed by using a first adhesive dispensing process and a second adhesive part 34 formed by using a second adhesive dispensing process. The first adhesive part 33 is connected to the hole wall 1311 of the transparent hole 131 and the liquid crystal box 12. The second adhesive part 34 is connected to the inner hole side part 222 and the first adhesive part 33. The second adhesive part 34 and the first adhesive part 33 form an integrated structure after the second adhesive dispensing process. The second adhesive dispensing process may be performed after the first adhesive part 33 is semi-cured or completely cured.

The first adhesive part 33 continuously surrounds the transparent region 301. The first adhesive part 33 extends in a circumferential direction of the light shielding region 302. The first adhesive part 33 is approximately annular. The first adhesive part 33 may be made of a light shielding material. The first adhesive part 33 may be a hot curing adhesive or a wet curing adhesive. The second adhesive part 34 continuously surrounds the transparent region 301. The second adhesive part 34 extends in the circumferential direction of the light shielding region 302. The second adhesive part 34 is approximately annular. The second adhesive part 34 may be made of a light shielding material. The first adhesive part 33 may be a hot curing adhesive or a wet curing adhesive.

In this embodiment, the first adhesive part 33 can shield leaked light from the lower polarizer 13 on the hole wall 1311 of the transparent hole 131, and the second adhesive part 34 can enable the backlight module 2 to be fixedly connected to the liquid crystal box 12 and can shield leaked light from the backlight module 2, so that the light shielding part 3 can shield leaked light on a periphery of the transparent region 301, and the liquid crystal display 30 has better display quality.

The light shielding part 3 includes the first adhesive part 33 and the second adhesive part 34 that are stacked and that are formed by using the two mutually independent adhesive dispensing processes, to resolve a problem that a narrow and high adhesive dispensing part cannot be formed due to adhesive mobility, so that the light shielding part 3 can have both a smaller cross-sectional area (parallel to a direction of the lower polarizer 13) and a larger height size (perpendicular to the direction of the lower polarizer 13). Therefore, the lower polarizer 13 and the backlight module 2 are better bonded, and the light shielding region 302 is relatively narrow.

In another embodiment, the light shielding part 3 may alternatively be formed by using three or more adhesive dispensing processes, so that the finally formed light shielding part 3 is connected to the hole wall 1311 of the transparent hole 131, the liquid crystal box 12, and the inner hole side part 222.

Optionally, the first adhesive part 33 has a first surface 331 facing the transparent region 301. The second adhesive part 34 has a second surface 341 facing the transparent region 301. The second surface 341 is flush with the first surface 331, or is away from the transparent region 301 relative to the first surface 331. In this embodiment, a cross-sectional shape (a shape of a cross section perpendicular to an extension direction of the first adhesive part 33) of the first adhesive part 33 is different from a cross-sectional shape (a shape of a cross section perpendicular to an extension direction of the second adhesive part 34) of the second adhesive part 34. The cross-sectional shape of the first adhesive part 33 is rectangular, and the cross-sectional shape of the second adhesive part 34 is triangular or fan-shaped. In this case, the second surface 341 of the second adhesive part 34 is away from the transparent region 301 relative to the first surface 331. In another embodiment, the cross-sectional shape of the first adhesive part 33 may alternatively be the same as or similar to the cross-sectional shape of the first adhesive part 33. For example, the cross-sectional shape of the first adhesive part 33 is rectangular. The cross-sectional shape of the second adhesive part 34 is rectangular. In this case, the second surface 341 may be flush with the first surface 331 or is away from the transparent region 301 relative to the first surface 331.

In this embodiment, the second surface 341 is flush with the first surface 331 or is away from the transparent region 301 relative to the first surface 331. Therefore, a distance between the second adhesive part 34 and the transparent region 301 is greater than or equal to a distance between the first adhesive part 33 and the transparent region 301, so that the second adhesive part 34 can fully use a size of the first adhesive part 33 in a width direction of the light shielding region 302, to help reduce a width of the light shielding region 302. Therefore, the liquid crystal display 30 and the electronic device 100 each have a more beautiful appearance, and a screen-to-body ratio is higher.

In this embodiment, the second surface 341 is gradually away from the transparent region 301 in a direction of being away from the first adhesive part 33. In this case, an adhesive dispensing amount of the second adhesive part 34 is relatively small, and costs of the liquid crystal display 30 are relatively low. The cross-sectional shape of the second adhesive part 34 may be triangular or fan-shaped. The second surface 341 may be a plane or a curved surface.

Optionally, a surface 332 that is of the first adhesive part 33 and that is connected to the second adhesive part 34 is a rough surface formed through surface roughening. One or more microstructures that can increase a surface area, such as a concave spot, a convex spot, a groove, a bump, a concave texture, or a convex texture, can be formed through surface roughening on the surface 332 that is of the first adhesive part 33 and that is connected to the second adhesive part 34, so that the surface 332 that is of the first adhesive part 33 and that is connected to the second adhesive part 34 is the rough surface, a bonding area between the second adhesive part 34 and the first adhesive part 33 is larger, and bonding force is stronger. Therefore, the second adhesive part 34 is not easily detached from the first adhesive part 33, and the light shielding part 3 has higher reliability.

Optionally, the inner hole side part 222 abuts against the lower polarizer 13, and an inner side surface 2223 that is of the inner hole side part 222 and that faces away from the outer peripheral side part 221 is flush with the hole wall 1311 of the transparent hole 131. A thickness (a size perpendicular to a direction of the lower polarizer 13) of the first adhesive part 33 is less than or equal to a thickness of the lower polarizer 13. Because the thickness of the first adhesive part 33 is less than or equal to the thickness of the lower polarizer 13, a top surface 2224 that is of the inner hole side part 222 and that faces away from the bottom part 223 can better abut against the lower polarizer 13, so that the backlight module 2 and the liquid crystal display panel 1 have higher assembly precision, and the liquid crystal display 30 has a higher yield rate.

Figure 13:
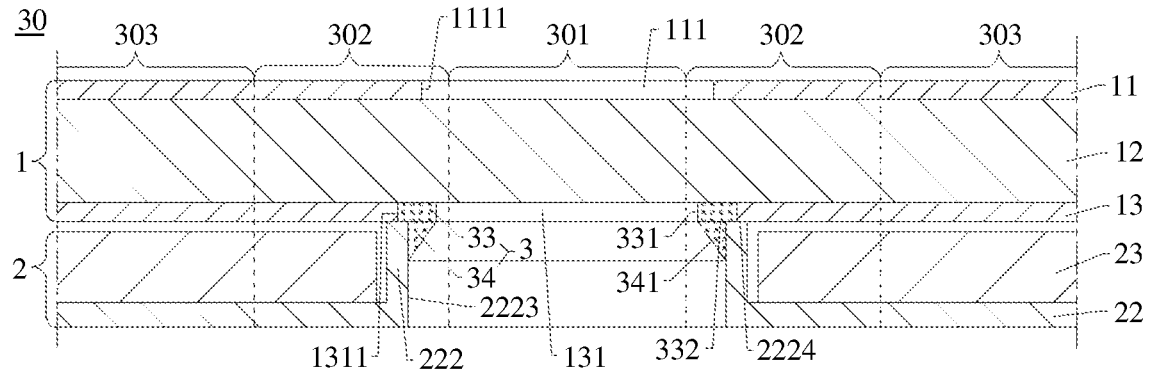
FIG. 13 is a schematic structural diagram of a liquid crystal display shown in FIG. 2B in a sixth embodiment.

FIG. 13 is a schematic structural diagram of the liquid crystal display 30 shown in FIG. 2B in a sixth embodiment. Most technical content in this embodiment that is the same as that in the foregoing embodiment is not described again.

The light shielding part 3 includes a first adhesive part 33 formed by using a first adhesive dispensing process and a second adhesive part 34 formed by using a second adhesive dispensing process. The first adhesive part 33 is connected to the hole wall 1311 of the transparent hole 131 and the liquid crystal box 12. The second adhesive part 34 is connected to the inner hole side part 222 and the first adhesive part 33. The inner hole side part 222 abuts against the lower polarizer 13 and the first adhesive part 33. A thickness of the first adhesive part 33 is equal to a thickness of the lower polarizer 13.

In this embodiment, because the thickness of the first adhesive part 33 is equal to the thickness of the lower polarizer 13, a top surface 2224 that is of the inner hole side part 222 and that is away from the bottom part 223 can smoothly abut against the lower polarizer 13 and the first adhesive part 33, so that the backlight module 2 and the liquid crystal display panel 1 have higher assembly precision, and the liquid crystal display 30 has a higher yield rate.

Figure 14:
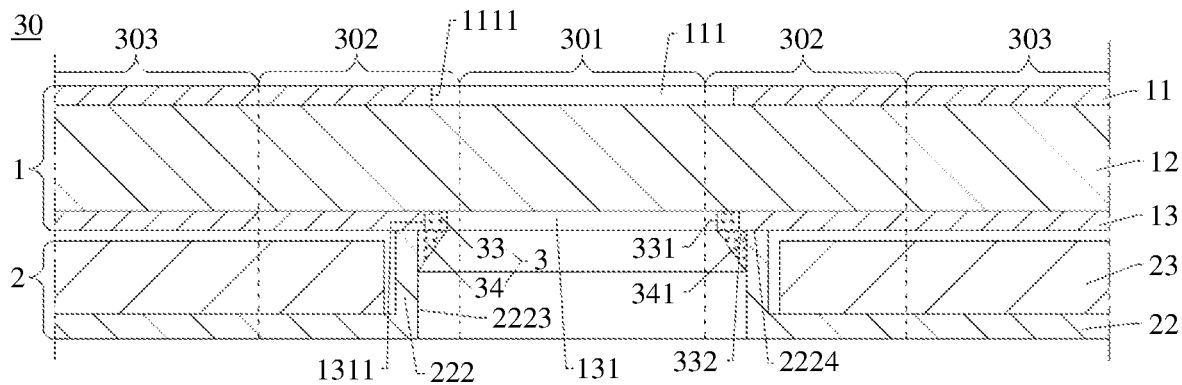
FIG. 14 is a schematic structural diagram of a liquid crystal display shown in FIG. 2B in a seventh embodiment.

FIG. 14 is a schematic structural diagram of the liquid crystal display 30 shown in FIG. 2B in a seventh embodiment. Most technical content in this embodiment that is the same as that in the foregoing embodiment is not described again.

The light shielding part 3 includes a first adhesive part 33 formed by using a first adhesive dispensing process and a second adhesive part 34 formed by using a second adhesive dispensing process. The first adhesive part 33 is connected to the hole wall 1311 of the transparent hole 131 and the liquid crystal box 12. The second adhesive part 34 is connected to the inner hole side part 222 and the first adhesive part 33. The inner hole side part 222 abuts against the lower polarizer 13. The hole wall 1311 of the transparent hole 131 is closer to the transparent region 301 compared with an inner side surface 2223 that is of the inner hole side part 222 and that faces away from the outer peripheral side part 221. The second adhesive part 34 bonds the first adhesive part 33, the lower polarizer 13, and the inner hole side part 222.

In this embodiment, because the hole wall 1311 of the transparent hole 131 is close to the transparent region 301 relative to the inner side surface of the inner hole side part 222, the inner hole side part 222 completely abuts against the lower polarizer 13, so that disposing the first adhesive part 33 does not affect assembly precision of the backlight module 2 and the liquid crystal display panel 1, and the liquid crystal display 30 can have a higher yield rate.

In this embodiment, a size relationship between a thickness of the first adhesive part 33 and a thickness of the lower polarizer 13 is not strictly limited. For example, in an implementation, the thickness of the first adhesive part 33 may be the same as the thickness of the lower polarizer 13.

In another implementation, the thickness of the first adhesive part 33 may alternatively be less than the thickness of the lower polarizer 13. In still another implementation, the thickness of the first adhesive part 33 may alternatively be greater than the thickness of the lower polarizer 13. In this case, the inner side surface 2223 of the inner hole side part 222 and the first adhesive part 33 form a groove structure. In a process of forming the second adhesive part 34, a part of the second adhesive part 34 flows into the groove structure, so that a connection area between the second adhesive part 34 and the first adhesive part 33 is larger, and a connection area between the second adhesive part 34 and the inner side surface 2223 of the inner hole side part 222 is larger. Therefore, the light shielding part 3 can be better and securely connected to the backlight module 2 and the liquid crystal display panel 1, and the light shielding part 3 has higher reliability.

Figure 15:
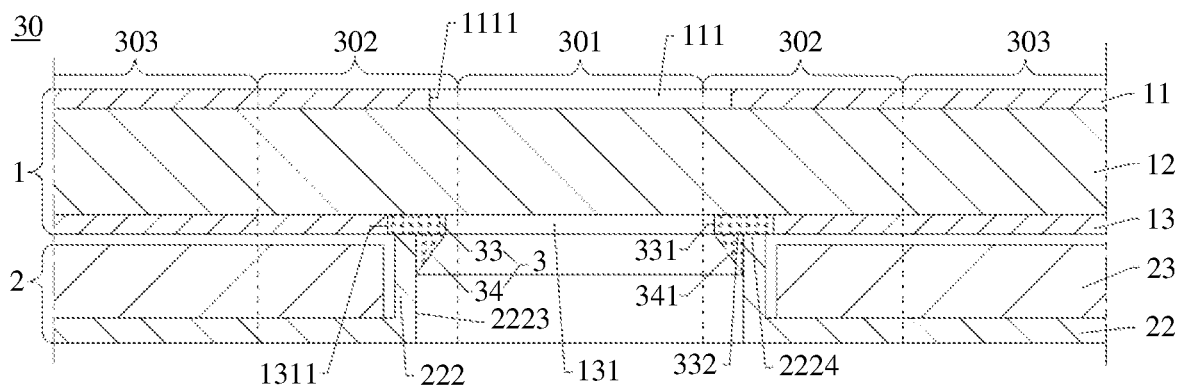
FIG. 15 is a schematic structural diagram of a liquid crystal display shown in FIG. 2B in an eighth embodiment.

FIG. 15 is a schematic structural diagram of the liquid crystal display 30 shown in FIG. 2B in an eighth embodiment. Most technical content in this embodiment that is the same as that in the foregoing embodiment is not described again.

The light shielding part 3 includes a first adhesive part 33 formed by using a first adhesive dispensing process and a second adhesive part 34 formed by using a second adhesive dispensing process. The first adhesive part 33 is connected to the hole wall 1311 of the transparent hole 131 and the liquid crystal box 12. The second adhesive part 34 is connected to the inner hole side part 222 and the first adhesive part 33. The inner hole side part 222 abuts against the first adhesive part 33. The hole wall 1311 of the transparent hole 131 is away from the transparent region 301 relative to the inner hole side part 222.

In this embodiment, because the hole wall 1311 of the transparent hole 131 is away from the transparent region 301 relative to the inner hole side part 222, the inner hole side part 222 completely abuts against the first adhesive part 33, so that a size relationship between a thickness of the first adhesive part 33 and a thickness of the lower polarizer 13 does not affect assembly precision of the backlight module 2 and the liquid crystal display panel 1, and the liquid crystal display 30 can have a higher yield rate.

In this embodiment, the size relationship between the thickness of the first adhesive part 33 and the thickness of the lower polarizer 13 is not strictly limited. For example, in an implementation, the thickness of the first adhesive part 33 may be the same as the thickness of the lower polarizer 13. In another implementation, the thickness of the first adhesive part 33 may alternatively be less than the thickness of the lower polarizer 13. In this case, the inner hole side part 222 can reuse a part of thickness space of the lower polarizer 13, to facilitate lightness and thinness of the liquid crystal display 30 and the electronic device 100. In still another implementation, the thickness of the first adhesive part 33 may alternatively be greater than the thickness of the lower polarizer 13. In this case, the inner side surface of the inner hole side part 222 and the first adhesive part 33 form a groove structure. In a process of forming the second adhesive part 34, a part of the second adhesive part 34 flows into the groove structure, so that a connection area between the second adhesive part 34 and the first adhesive part 33 is larger, and a connection area between the second adhesive part 34 and the inner side surface of the inner hole side part 222 is larger. Therefore, the light shielding part 3 can be better and securely connected to the backlight module 2 and the liquid crystal display panel 1, and the light shielding part 3 has higher reliability.

Referring to FIG. 12 to FIG. 15 together, an embodiment of this application further provides a method for manufacturing the liquid crystal display 30. The method for manufacturing the liquid crystal display 30 can be used to manufacture the liquid crystal display 30 shown in FIG. 12 to FIG. 15.

The method for manufacturing the liquid crystal display 30 includes the following steps:

S011. Provide a liquid crystal display panel 1. The liquid crystal display panel 1 includes a liquid crystal box 12 and a lower polarizer 13 fastened to the liquid crystal box 12. The lower polarizer 13 includes a transparent hole 131.

S013: Dispense an adhesive on an inner side of the transparent hole 131 to form a first adhesive part 33. The first adhesive part 33 is connected to a hole wall 1311 of the transparent hole 131 and the liquid crystal box 12. The adhesive dispensing step in this step corresponds to a first adhesive dispensing process.

S015: Abut against the liquid crystal display panel 1 by using an inner hole side part 222 of a backlight module 2. The backlight module 2 includes a bracket 22 and a backlight film 23. The bracket 22 includes an outer peripheral side part 221, the inner hole side part 222 located on an inner side of the outer peripheral side part 221, and a bottom part 223 connected between the outer peripheral side part 221 and the inner hole side part 222. The outer peripheral side part 221, the inner hole side part 222, and the bottom part 223 jointly form accommodation space 224. The backlight film 23 is accommodated in the accommodation space 224.

S017. Dispense an adhesive on a side that is of the inner hole side part 222 and that is away from the outer peripheral side part 221 to form a second adhesive part 34. The second adhesive part 34 is connected to the first adhesive part 33 and the inner hole side part 222. In this case, the second adhesive part 34 and the first adhesive part 33 form an integrated structure. The adhesive dispensing step in this step corresponds to a second adhesive dispensing process.

In this embodiment, the first adhesive part 33 and the second adhesive part 34 that are formed by using the two mutually independent adhesive dispensing processes can be stacked into the integrated structure, to form the light shielding part 3, so that the light shielding part 3 has a smaller cross-sectional area (parallel to a direction of the lower polarizer 13) and a larger height size (perpendicular to the direction of the lower polarizer 13). Therefore, the lower polarizer 13 and the backlight module 2 are better bonded, and the light shielding region 302 is relatively narrow.

Optionally, in the process (that is, the first adhesive dispensing process) of dispensing an adhesive on an inner side of the transparent hole 131 to form a first adhesive part 33, an adhesive dispensing plane of an adhesive dispensing pin configured to dispense an adhesive is parallel to the lower polarizer 13. In this case, a cross-sectional shape of the first adhesive part 33 is approximately rectangular. A surface that is of the first adhesive part 33 and that is away from the lower polarizer 13 can be approximately parallel to the lower polarizer 13, so that an appropriate molding surface can be provided for an adhesive dispensing process of the second adhesive part 34. Therefore, the second adhesive part 34 has better molding quality, and the light shielding part 3 has higher reliability. The adhesive dispensing pin may be translated around the transparent hole 131 along an extension direction of the hole wall 1311 of the transparent hole 131, to form the first adhesive part 33 that is continuous and approximately annular.

Optionally, in the process (that is, the second adhesive dispensing process) of dispensing an adhesive on a side that is of the inner hole side part 222 and that is away from the outer peripheral side part 221 to form a second adhesive part 34, the adhesive dispensing plane of the adhesive dispensing pin configured to dispense an adhesive is inclined relative to the lower polarizer 13. For example, an included angle of 30° to 60° (for example, 45°) may be formed between the adhesive dispensing plane of the adhesive dispensing pin and the lower polarizer 13. A needle of the adhesive dispensing pin faces a corner of an included angle between the first adhesive part 33 and the inner hole side part 222. Because the adhesive dispensing plane of the adhesive dispensing pin is inclined relative to the lower polarizer 13, an adhesive flowing out of the adhesive dispensing pin can better flow into the corner of the included angle between the first adhesive part 33 and the inner hole side part 222, so that the second adhesive part 34 can better bond the first adhesive part 33 and the inner hole side part 222, and the backlight module 2 and the liquid crystal display panel 1 are more securely connected. The second adhesive part 34 can form a second surface 341 that is inclined relative to the first adhesive part 33. The second surface 341 is away from the transparent region 301 relative to the first surface 331, and the second surface 341 is gradually away from the transparent region 301 in a direction of being away from the first adhesive part 33. The adhesive dispensing pin may rotate around a central axis of the transparent hole 131, to form the second adhesive part 34 that is continuous and approximately annular.

Certainly, in another embodiment, in the process of dispensing an adhesive 32 on a side that is of the inner hole side part 222 and that is away from the outer peripheral side part 221 to form a second adhesive part 34, the adhesive dispensing plane of the adhesive dispensing pin configured to dispense an adhesive may alternatively be parallel to the lower polarizer 13. In this case, a cross-sectional shape of the second adhesive part 34 is approximately rectangular. For an adhesive dispensing process (that is, the second adhesive dispensing process) of the second adhesive part 34, refer to an adhesive dispensing process (that is, the first adhesive dispensing process) of the first adhesive part 33 for design.

Referring to FIG. 12 and FIG. 14 together, in another implementation, the method for manufacturing the liquid crystal display 30 may alternatively include the following steps.

S021. Provide a liquid crystal display panel 1. The liquid crystal display panel 1 includes a liquid crystal box 12 and a lower polarizer 13 fastened to the liquid crystal box 12. The lower polarizer 13 includes a transparent hole 131.

S023: Abut against the liquid crystal display panel 1 by using an inner hole side part 222 of a backlight module 2. The backlight module 2 includes a bracket 22 and a backlight film 23. The bracket 22 includes an outer peripheral side part 221, the inner hole side part 222 located on an inner side of the outer peripheral side part 221, and a bottom part 223 connected between the outer peripheral side part 221 and the inner hole side part 222. The outer peripheral side part 221, the inner hole side part 222, and the bottom part 223 jointly form accommodation space 224. The backlight film 23 is accommodated in the accommodation space 224.

S025: Dispense an adhesive on an inner side of the transparent hole 131 to form a first adhesive part 33. The first adhesive part 33 is connected to a hole wall 1311 of the transparent hole 131 and the liquid crystal box 12. The adhesive dispensing step in this step corresponds to a first adhesive dispensing process.

S027. Dispense an adhesive on a side that is of the inner hole side part 222 and that is away from the outer peripheral side part 221 to form a second adhesive part 34. The second adhesive part 34 is connected to the first adhesive part 33 and the inner hole side part 222. In this case, the second adhesive part 34 and the first adhesive part 33 form an integrated structure. The adhesive dispensing step in this step corresponds to a second adhesive dispensing process.

Figure 16:
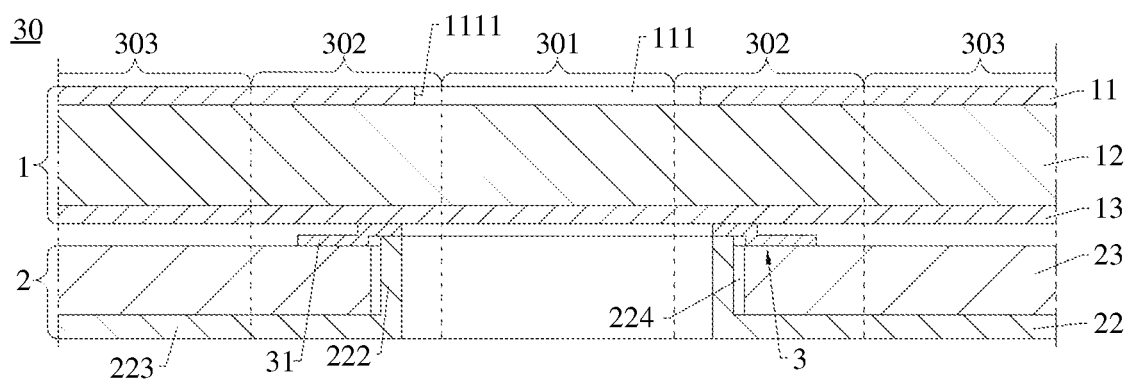
FIG. 16 is a schematic structural diagram of a liquid crystal display shown in FIG. 2B in a ninth embodiment.

Referring to FIG. 6 and FIG. 16 together, FIG. 16 is a schematic structural diagram of the liquid crystal display 30 shown in FIG. 2B in a ninth embodiment. Most technical content in this embodiment that is the same as that in the foregoing embodiment is not described again.

The liquid crystal display 30 includes a transparent region 301, a light shielding region 302 surrounding a periphery of the transparent region 301, and a display region 303 surrounding a periphery of the light shielding region 302. The liquid crystal display 30 includes an upper polarizer 11, a liquid crystal box 12, a lower polarizer 13, and a backlight module 2 that are sequentially disposed in a stacked manner. The upper polarizer 11 covers the display region 303 and is provided with a transparent hole 11. A hole wall of the transparent hole 11 is located in the light shielding region 302. The transparent hole 131 covers the transparent region 301. A part that is of the liquid crystal box 12 and that is located in the transparent region 301 is configured to allow visible light to pass through. A part that is of the liquid crystal box 12 and that is located in the light shielding region 302 is configured to shield visible light. A part that is of the liquid crystal box 12 and that is located in the display region 303 is configured to display an image. The lower polarizer 13 continuously covers the transparent region 301, the light shielding region 302, and the display region 303.

The backlight module 2 includes a bracket 22 and a backlight film 23. The bracket 22 includes an outer peripheral side part 221, an inner hole side part 222 located on an inner side of the outer peripheral side part 221, and a bottom part 223 connected between the outer peripheral side part 221 and the inner hole side part 222. The outer peripheral side part 221, the inner hole side part 222, and the bottom part 223 jointly form accommodation space 224. The backlight film 23 is accommodated in the accommodation space 224 and covers the display region 303. The inner hole side part 222 is located in the light shielding region 302.

The liquid crystal display 30 further includes a light shielding part 3. The light shielding part 3 is located in the light shielding region 302 and continuously surrounds the transparent region 301. The light shielding part 3 is connected to the lower polarizer 13 and the inner hole side part 222.

In this embodiment, because the upper polarizer 11 is provided with the transparent hole 131 that covers the transparent region 301, the transparent region 301 of the liquid crystal display 30 allows visible light to pass through. Therefore, the optical device 20 of the electronic device 100 can directly face the transparent region 301, and is placed below the transparent region 301, to transmit visible light by using the transparent region 301. In this way, there is no need to occupy lateral peripheral space of the liquid crystal display 30, so that a limitation of the optical device 20 on arrangement space of the liquid crystal display 30 is reduced; in addition, the transparent region 301 is surrounded by the display region 303, so that a larger display region 303 can be disposed on the liquid crystal display 30, to reduce a frame area of the electronic device 100, increase a display area of the electronic device 100, and increase a screen-to-body ratio of the electronic device 100.

Because the lower polarizer 13 continuously covers the transparent region 301, the light shielding region 302, and the display region 303, the lower polarizer 13 is a complete film, to avoid a light leakage of the lower polarizer 13 in the transparent region 301. Because the light shielding part 3 is connected to the lower polarizer 13 and the inner hole side part 222, light of the backlight module 2 does not escape from a part between the inner hole side part 222 and a liquid crystal display panel 1 to the transparent region 301, to avoid a light leakage and uneven displaying on a periphery of the transparent region 301 of the liquid crystal display 30, and also help ensure working quality of the optical device 20.

Optionally, the light shielding part 3 includes a double-sided tape 31. The double-sided tape 31 is located between the backlight module 2 and the lower polarizer 13, and is connected to the backlight film 23, the inner hole side part 222, and the lower polarizer 13. The double-sided tape 31 continuously surrounds the transparent region 301. In other words, the double-sided tape 31 extends in a circumferential direction of the light shielding region 302. The double-sided tape 31 is approximately annular. The double-sided tape 31 may include a light shielding substrate and bonding layers 50 located on two opposite sides of the substrate.

In this embodiment, the double-sided tape 31 is connected to the backlight film 23, the inner hole side part 222, and the liquid crystal box 12, so that the backlight film 23 is fastened to the bracket 22, and the backlight module 2 is fastened to the liquid crystal display panel 1, and can shield light emitted from the optical film, to reduce a risk of a light leakage on the liquid crystal display 1. Therefore, the liquid crystal display 30 has a better display effect.

Optionally, in another embodiment, for a structure of the inner hole side part 222 and a connection relationship between the double-sided tape 31 and the inner hole side part 222, refer to the embodiments shown in FIG. 8 and FIG. 9. Details are as follows:

The inner hole side part 222 includes a main part 2221 and an extension part 2222. The main part 2221 is connected between the bottom part 223 and the extension part 2222. The extension part 2222 is bent relative to the main part 2221 in a direction of being away from the transparent region 301 or in a direction of approaching the transparent region 301. A width of a cross section that is of the extension part 2222 and that is parallel to the lower polarizer 13 is greater than a width of a cross section that is of the main part 2221 and that is parallel to the lower polarizer 13. The double-sided tape 31 is connected to the extension part 2222.

In this embodiment, the double-sided tape 31 is connected to the extension part 2222, and the width of the cross section that is of the extension part 2222 and that is parallel to the lower polarizer 13 is greater than the width of the cross section that is of the main part 2221 and that is parallel to the lower polarizer 13. Therefore, a connection area between the double-sided tape 31 and the inner hole side part 222 is larger, to reduce a risk of peeling of the double-sided tape 31, so that the liquid crystal display 30 has higher reliability.

When the extension part 2222 is bent relative to the main part 2221 in the direction of approaching the transparent region 301, the extension part 2222 does not occupy space of the accommodation space 224 of the bracket 22. Therefore, the backlight film 23 can fully use the accommodation space 224, to reduce an overall thickness of the backlight module 2, and facilitate lightness and thinness of the liquid crystal display 30 and the electronic device 100.

When the extension part 2222 is bent relative to the main part 2221 in the direction of being away from the transparent region 301, in other words, is bent in a direction of approaching the backlight film 23, the extension part 2222 can reuse width space of the light shielding region 302 with the bottom part 223. Therefore, a width of the light shielding region 302 can be reduced while bonding reliability of the double-sided tape 31 is ensured, so that the liquid crystal display 30 and the electronic device 100 each have a more beautiful appearance, and a screen-to-body ratio is higher.

Figure 17:
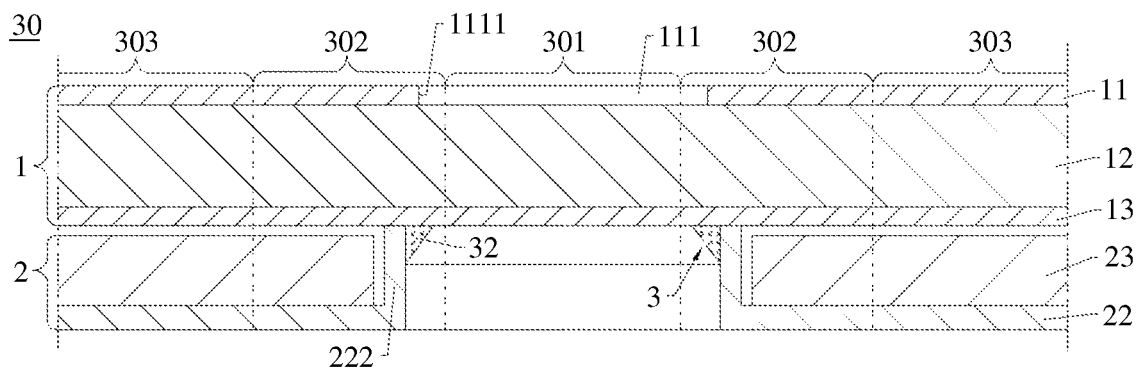
FIG. 17 is a schematic structural diagram of a liquid crystal display shown in FIG. 2B in a tenth embodiment.

FIG. 17 is a schematic structural diagram of the liquid crystal display 30 shown in FIG. 2B in a tenth embodiment. Most technical content in this embodiment that is the same as that in the foregoing embodiment is not described again.

The light shielding part 3 includes a dispensing adhesive 32. The dispensing adhesive 32 is located on a side that is of the inner hole side part 222 and that is away from the outer peripheral side part 221 (referring to FIG. 6), and is connected to the lower polarizer 13 and the inner hole side part 222. The dispensing adhesive 32 continuously surrounds the transparent region 301. In other words, the dispensing adhesive 32 extends in a circumferential direction of the light shielding region 302. The dispensing adhesive 32 is approximately annular. The dispensing adhesive 32 may be made of a light shielding material. The dispensing adhesive 32 may be a hot curing adhesive or a wet curing adhesive.

In this embodiment, the dispensing adhesive 32 can be securely connected to the inner hole side part 222 and the lower polarizer 13. Therefore, light of the backlight module 2 does not escape from a part between the inner hole side part 222 and a liquid crystal display panel 1 to the transparent region 301, to avoid a light leakage and uneven displaying on a periphery of the transparent region 301 of the liquid crystal display 30, and also help ensure working quality of the optical device 20.

FIG. 18 is a schematic structural diagram of the liquid crystal display 30 shown in FIG. 2B in an eleventh embodiment. Most technical content in this embodiment that is the same as that in the foregoing embodiment is not described again.

The light shielding part 3 includes a double-sided tape 31 and a dispensing adhesive 32. The double-sided tape 31 is located between the backlight module 2 and the lower polarizer 13, and is connected to the backlight film 23, the inner hole side part 222, and the lower polarizer 13. The dispensing adhesive 32 is located on a side that is of the inner hole side part 222 and that is away from the outer peripheral side part 221, and is connected to the lower polarizer 13, the double-sided tape 31, and the inner hole side part 222.

In this embodiment, the dispensing adhesive 32 and the double-sided tape 31 are jointly configured to connect the backlight module 2 and the liquid crystal display panel 1, so that reliability of the connection between the backlight module 2 and the liquid crystal display panel 1 is higher. Therefore, peeling of the light shielding part 3 does not easily occur, and the liquid crystal display 30 has higher reliability.

The foregoing descriptions are merely specific implementations of this application, but are not intended to limit the protection scope of this application. Any variation or replacement readily figured out by a person skilled in the art within the technical scope disclosed in this application shall fall within the protection scope of this application. When no conflict occurs, the implementations of this application and the features in the implementations may be mutually combined. Therefore, the protection scope of this application shall be subject to the protection scope of the claims.

What is claimed is:

1. An electronic device, comprising:
a housing;
an optical device; and
a liquid crystal display installed on the housing, wherein the liquid crystal display comprises a transparent region, a light shielding region surrounding a periphery of the transparent region, and a display region surrounding a periphery of the light shielding region;
wherein the liquid crystal display and the housing, together, define, and enclose, an entire inner cavity, wherein the optical device is accommodated in the entire inner cavity and wherein the optical device directly faces the transparent region;
wherein the liquid crystal display comprises an upper polarizer, a liquid crystal box, a lower polarizer, and a backlight module that are sequentially disposed in a stacked manner;
wherein the upper polarizer covers the display region and is provided with a transparent hole;
wherein a first part, that is of the liquid crystal box and that is located in the transparent region, is configured to allow visible light to pass through, wherein a second part, that is of the liquid crystal box and that is located in the light shielding region, comprises a light shielding element that is disposed in the second part between the upper polarizer and the lower polarizer and is at least one of a black matrix or a light shielding layer, wherein the second part is configured to shield visible light using the light shielding element, and wherein a third part, that is of the liquid crystal box and that is located in the display region, is configured to display an image, wherein the second part of the liquid crystal box extends laterally from the first part of the liquid crystal box to the third part of the liquid crystal box without extending over the first part of the liquid crystal box or the third part of the liquid crystal box, wherein a hole wall of the transparent hole is located in the light shielding region, and wherein the transparent hole extends contiguously from between an inner edge and an outer edge of a first portion of the second part, completely across the first part, past an inner edge of a second portion of the second part disposed across the first part from the first portion of the second part;
wherein the lower polarizer continuously covers the transparent region, the light shielding region, and the display region;
wherein the backlight module comprises a bracket and a backlight film;
wherein the bracket comprises an outer peripheral side part, further comprises an inner hole side part located on an inner side of the outer peripheral side part, and further comprises a bottom part connected between the outer peripheral side part and the inner hole side part, wherein the outer peripheral side part, the inner hole side part, and the bottom part jointly form an accommodation space, wherein the backlight film is disposed in the accommodation space and covers the display region, and wherein the inner hole side part is located in the light shielding region; and
wherein the liquid crystal display further comprises a light shielding part, wherein the light shielding part is separate from the light shielding element of the second part, wherein the light shielding part is located in the light shielding region and continuously surrounds the transparent region without extending into the transparent region or the display region, and wherein the light shielding part is disposed on the backlight film between the backlight module and the lower polarizer and is connected to the lower polarizer and an uppermost surface of the inner hole side part, wherein the light shielding part extends from above the uppermost surface of the inner hole side part away from the inner hole, and extends below the uppermost surface of the inner hole side part to directly contact the uppermost surface of the backlight film.

2. The electronic device according to claim 1, wherein a topmost surface of the inner hole side part faces the liquid crystal box and is disposed between a lowermost portion of the liquid crystal box that faces the backlight film and a lowermost portion of the lower polarizer that faces the backlight film.

3. The electronic device according to claim 1, wherein the light shielding part comprises double-sided tape, and wherein the double-sided tape is disposed between the backlight module and the lower polarizer, and is connected to the backlight film, the inner hole side part, and the lower polarizer.

4. The electronic device according to claim 3, wherein a first portion of the double-sided tape is disposed between, and in direct contact with, a bottommost surface of the liquid crystal box facing the backlight film and an uppermost surface of the inner hole side part facing the liquid crystal box, and wherein a second portion of the double-sided tape is disposed between, and in direct contact with, an uppermost surface of the backlight film facing the liquid crystal box and a bottom most surface of the lower polarizer facing the backlight film.

5. The electronic device according to claim 3, wherein the inner hole side part comprises a main part and an extension part, wherein the main part is connected between the bottom part and the extension part, wherein the extension part extends relative to the main part in a first direction in which the extension part is away from the transparent region or in a second direction toward the transparent region, wherein a width of a cross section that is of the extension part and that is in a direction parallel to the lower polarizer is greater than a width of a cross section that is of the main part and that is in the direction parallel to the lower polarizer, and wherein the double-sided tape is connected to the extension part.

6. The electronic device according to claim 5, wherein a topmost surface of the extension part faces the liquid crystal box and is disposed between a lowermost portion of the liquid crystal box that faces the backlight film and a lowermost portion of the lower polarizer that faces the backlight film.

7. The electronic device according to claim 1, wherein the light shielding part comprises a dispensing adhesive, wherein the dispensing adhesive is located on a side of the inner hole side part that is away from the outer peripheral side part, and wherein the dispensing adhesive is connected to the lower polarizer and the inner hole side part.

8. An electronic device, comprising:
a housing;
an optical device; and
a liquid crystal display disposed on the housing, the liquid crystal display having a transparent region, a light shielding region surrounding a periphery of the transparent region, and a display region surrounding a periphery of the light shielding region, wherein the liquid crystal display comprises a liquid crystal box, and a backlight module, and wherein the liquid crystal display further comprises an upper polarizer disposed on a first surface of the liquid crystal box and a lower polarizer disposed on a second surface of the liquid crystal box and between the liquid crystal box and a portion of the backlight module;

wherein the optical device is disposed in a cavity bounded by the liquid crystal display and the housing, and wherein the optical device directly faces the transparent region;

wherein the upper polarizer covers the display region and has a transparent portion;

wherein a first part, that is of the liquid crystal box and that is in the transparent region, is configured to allow visible light to pass through, wherein a second part, that is of the liquid crystal box and that is in the light shielding region, comprises a light shielding element that is disposed in the second part between the upper polarizer and the lower polarizer and is at least one of a black matrix or a light shielding layer, wherein the second part is configured to shield visible light using the light shielding element, and wherein a third part, that is of the liquid crystal box and that is in the display region, is configured to display an image, wherein the second part of the liquid crystal box extends laterally from the first part of the liquid crystal box to the third part of the liquid crystal box without extending over the first part of the liquid crystal box or the third part of the liquid crystal box, wherein a hole wall of the transparent portion of the upper polarizer is located in the light shielding region, and wherein the transparent region extends contiguously from between an inner edge and an outer edge of a first portion of the second part, completely across the first part, past an inner edge of a second portion of the second part disposed across the first part from the first portion of the second part;

wherein the lower polarizer continuously covers the transparent region, the light shielding region, and the display region;

wherein the backlight module comprises a bracket and a backlight film;

wherein the bracket extends contiguously from a bottommost surface of the backlight film, around an edge of the backlight film at the cavity and into the light shielding region, and past an uppermost surface of the backlight film, wherein the backlight film covers the display region; and wherein the liquid crystal display further comprises a light shielding part separate from the light shielding element of the second part, wherein the light shielding part is located in the light shielding region and continuously surrounds the transparent region without extending into the transparent region or the display region, wherein the light shielding part is disposed on an uppermost surface of the backlight film between the backlight module and the lower polarizer and is connected to the lower polarizer and an uppermost surface of the bracket, wherein the light shielding part extends from above the uppermost surface of the inner hole side part away from the inner hole, and extends below the uppermost surface of the inner hole side part to directly contact the uppermost surface of the backlight film.

9. The electronic device according to claim 8, wherein a topmost surface of the bracket faces the liquid crystal box and is disposed between a lowermost portion of the liquid crystal box that faces the backlight film and a lowermost portion of the lower polarizer that faces the backlight film.

10. The electronic device according to claim 8, wherein the light shielding part comprises double-sided tape, and wherein the double-sided tape is disposed between the backlight module and the lower polarizer, and is connected to the backlight film, the bracket, and the lower polarizer.

11. The electronic device according to claim 10, wherein a first portion of the double-sided tape is disposed between, and in direct contact with, a bottommost surface of the liquid crystal box facing the backlight film and an uppermost surface of bracket facing the liquid crystal box, and wherein a second portion of the double-sided tape is disposed between, and in direct contact with, an uppermost surface of the backlight film facing the liquid crystal box and a bottom most surface of the lower polarizer facing the backlight film.

12. The electronic device according to claim 10, wherein an extension part of the bracket extends a first direction away from the transparent region or in a second direction toward the transparent region, wherein a width of a cross section that is of the extension part and that is in a direction parallel to the lower polarizer is greater than a width of a cross section that is of a main part of the bracket and that is in the direction parallel to the lower polarizer, and wherein the double-sided tape is connected to the extension part.

13. The electronic device according to claim 12, wherein a topmost surface of the extension part faces the liquid crystal box and is disposed between a lowermost portion of the liquid crystal box that faces the backlight film and a lowermost portion of the lower polarizer that faces the backlight film.

14. An apparatus, comprising:
a housing;
an optical device; and
a liquid crystal display disposed on the housing, wherein the liquid crystal display has a transparent region, a light shielding region surrounding a periphery of the transparent region, and a display region surrounding a periphery of the light shielding region, wherein the liquid crystal display comprises a liquid crystal box, and a backlight module, and wherein the liquid crystal display further comprises an upper polarizer disposed on a first surface of the liquid crystal box and a lower polarizer disposed on a second surface of the liquid crystal box and between the liquid crystal box and a portion of the backlight module;

wherein the optical device is disposed in a cavity bounded by the transparent region of the liquid crystal display and the housing;

wherein the upper polarizer covers the display region and has a transparent portion;

wherein a first part of the liquid crystal box is in the transparent region and is configured to allow visible light to pass through, wherein a second part of the liquid crystal box is in the light shielding region and comprises a light shielding element that is disposed in the second part between the upper polarizer and the lower polarizer and is at least one of a black matrix or a light shielding layer, wherein the second part is configured to shield visible light using the light shielding element, and wherein a third part of the liquid crystal box is in the display region and is configured to display an image, wherein the second part of the liquid crystal box extends laterally from the first part of the liquid crystal box to the third part of the liquid crystal box without extending over the first part of the liquid crystal box or the third part of the liquid crystal, wherein a hole wall of the transparent portion is located in the light shielding region, and wherein the transparent hole extends contiguously from between an inner edge and an outer edge of a first portion of the second part, completely across the first part, past an inner edge of a second portion of the second part disposed across the first part from the first portion of the second part;

wherein the lower polarizer continuously covers the transparent region, the light shielding region, and the display region;

wherein the backlight module comprises a bracket and a backlight film;

wherein the bracket comprises an outer peripheral side part, further comprises an inner hole side part on an inner side of the outer peripheral side part, and further comprises a bottom part connected between the outer peripheral side part and the inner hole side part, wherein the outer peripheral side part, the inner hole side part, and the bottom part jointly form an accommodation space, wherein the backlight film is disposed in the accommodation space and covers the display region, and wherein the inner hole side part is in the light shielding region; and wherein the liquid crystal display further comprises a light shielding part separate from the light shielding element of the second part, wherein the light shielding part is located in the light shielding region and continuously surrounds the transparent region, wherein the light shielding part is disposed on an uppermost surface of the backlight film between the backlight module and the lower polarizer and is connected to the lower polarizer and an uppermost surface of the inner hole side part, and wherein the light shielding part extends from above the uppermost surface of the inner hole side part away from the inner hole, and extends below the uppermost surface of the inner hole side part to directly contact the uppermost surface of the backlight film.

15. The apparatus according to claim 14, wherein a topmost surface of the inner side hole part faces the liquid crystal box and is disposed between a lowermost portion of the liquid crystal box that faces the backlight film and a lowermost portion of the lower polarizer that faces the backlight film.

16. The apparatus according to claim 14, wherein the light shielding part comprises double-sided tape, and wherein the double-sided tape is disposed between the backlight module and the lower polarizer, and is connected to the backlight film, the inner hole side part, and the lower polarizer.

17. The apparatus according to claim 16, wherein a first portion of the double-sided tape is disposed between, and in direct contact with, a bottommost surface of the liquid crystal box facing the backlight film and an uppermost surface of the inner hole side part facing the liquid crystal box, and wherein a second portion of the double-sided tape is disposed between, and in direct contact with, an uppermost surface of the backlight film facing the liquid crystal box and a bottom most surface of the lower polarizer facing the backlight film.

18. The apparatus according to claim 16, wherein the inner hole side part comprises a main part and an extension part, wherein the main part is connected between the bottom part and the extension part, wherein the extension part extends relative to the main part in a first direction in which the extension part is away from the transparent region or in a second direction toward the transparent region, wherein a width of a cross section that is of the extension part and that is in a direction parallel to the lower polarizer is greater than a width of a cross section that is of the main part and that is in the direction parallel to the lower polarizer, and wherein the double-sided tape is connected to the extension part.

19. The apparatus according to claim 18, wherein a topmost surface of the extension part faces the liquid crystal box and is disposed between a lowermost portion of the liquid crystal box that faces the backlight film and a lowermost portion of the lower polarizer that faces the backlight film.

20. The apparatus according to claim 14, wherein the light shielding part comprises a dispensing adhesive, wherein the dispensing adhesive is located on a side of the inner hole side part that is away from the outer peripheral side part, and wherein the dispensing adhesive is connected to the lower polarizer and the inner hole side part.

* * * * *